United States Patent
Taherzadeh Boroujeni et al.

(10) Patent No.: US 11,658,850 B2
(45) Date of Patent: May 23, 2023

(54) PHASE TRACKING REFERENCE SIGNAL ACTIVATION BASED ON REPETITION INDICATION OR DEMODULATION REFERENCE SIGNAL BUNDLING INDICATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Junyi Li, Fairless Hills, PA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/316,191

(22) Filed: May 10, 2021

(65) Prior Publication Data
US 2022/0368568 A1 Nov. 17, 2022

(51) Int. Cl.
*H04L 5/00* (2006.01)
*H04L 25/02* (2006.01)
*H04W 72/04* (2023.01)

(52) U.S. Cl.
CPC ........ *H04L 25/0224* (2013.01); *H04L 5/0048* (2013.01); *H04L 25/0204* (2013.01); *H04W 72/042* (2013.01)

(58) Field of Classification Search
CPC ............... H04L 25/0224; H04L 5/0048; H04L 25/0204; H04W 72/042
See application file for complete search history.

(56) References Cited

U.S. PATENT DOCUMENTS

| | | | |
|---|---|---|---|
| 10,651,963 B2 | 5/2020 | Shin et al. | |
| 10,924,235 B2 | 2/2021 | Lee et al. | |
| 2020/0052848 A1* | 2/2020 | Gao | ............... H04W 72/046 |
| 2021/0105120 A1 | 4/2021 | Khoshnevisan et al. | |
| 2021/0160025 A1* | 5/2021 | Gao | ..................... H04L 5/0048 |
| 2022/0060297 A1* | 2/2022 | Tomeba | ................. H04B 7/063 |

FOREIGN PATENT DOCUMENTS

| | | |
|---|---|---|
| WO | 2021050735 A1 | 3/2021 |
| WO | 2022031919 A1 | 2/2022 |

OTHER PUBLICATIONS

"PDSCH and PUSCH enhancements for 52.6-71GHz band," 3GPP TSG-RAN WG1 #104-e, e-Meeting, Jan. 25-Feb. 5, 2021, 11 pages.
(Continued)

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a repetition factor associated with a message or an indication that demodulation reference signal (DMRS) bundling is to be applied for the message for joint channel estimation. The UE may communicate a phase tracking reference signal (PTRS) associated with the message based at least in part on receiving the indication of the repetition factor or the indication that DMRS bundling is to be applied. Numerous other aspects are described.

30 Claims, 9 Drawing Sheets

600

610 — Receive an indication of a repetition factor associated with a message or an indication that demodulation reference signal (DMRS) bundling is to be applied for the message for joint channel estimation 620 — Communicate a phase tracking reference signal (PTRS) associated with the message based at least in part on receiving the indication of the repetition factor or the indication that DMRS bundling is to be applied

(56) References Cited

OTHER PUBLICATIONS

Interdigital, et al., "Joint Channel Estimation for PUSCH", 3GPP TSG RAN WG1 #104-bis-e, R1-2103009, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021 (Apr. 7, 2021), XP052177819, 11 Pages, Sections 2.2-2.3.
International Search Report and Written Opinion—PCT/US2022/072177—ISA/EPO—dated Sep. 9, 2022.
Moderator (China Telecom): "FL Summary of Joint Channel Estimation for PUSCH", 3GPP TSG RAN WG1 Meeting #104bis-e, R1-2103808, 3rd Generation Partnership Project, Mobile Competence Centre, 650, Route Des Lucioles, F-06921 Sophia-Antipolis Cedex, France, vol. RAN WG1, No. E-Meeting, Apr. 12, 2021-Apr. 20, 2021, Apr. 13, 2021, XP051995267, 30 Pages.
Qualcomm Incorporated: "Joint Channel Estimation for PUSCH", 3GPP TSG-RAN WG1 Meeting #104b-e, R1-2103180, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021 (Apr. 7, 2021), XP052177979, 8 Pages.

* cited by examiner

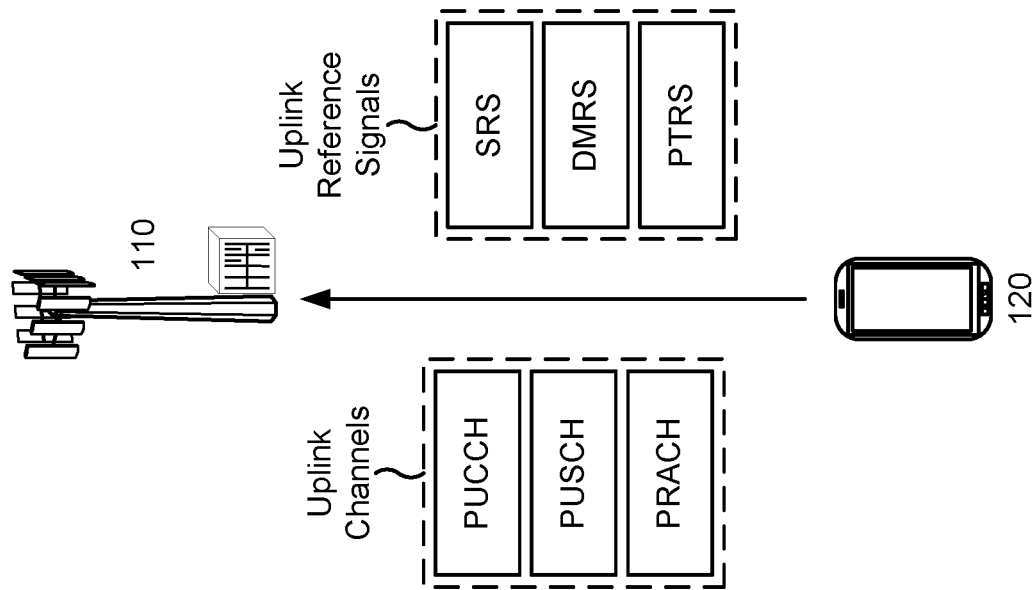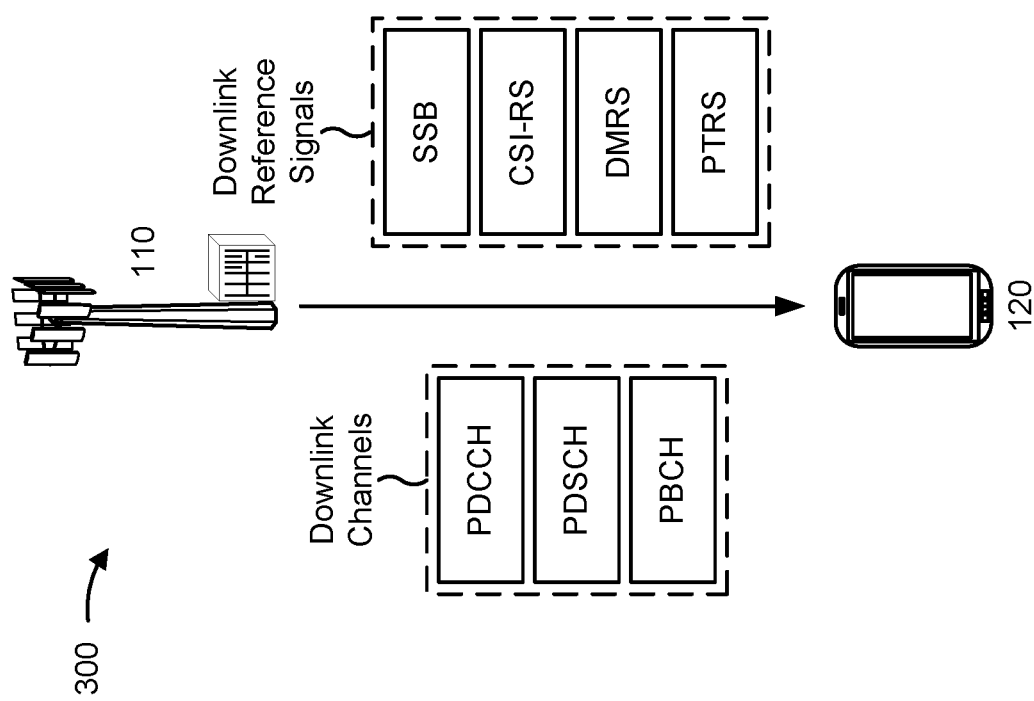
FIG. 3

PHASE TRACKING REFERENCE SIGNAL ACTIVATION BASED ON REPETITION INDICATION OR DEMODULATION REFERENCE SIGNAL BUNDLING INDICATION

FIELD OF THE DISCLOSURE

Aspects of the present disclosure generally relate to wireless communication and to techniques and apparatuses for phase tracking reference signal (PTRS) activation based on repetition indication or demodulation reference signal (DMRS) bundling indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and "uplink" (or "reverse link") refers to the communication link from the UE to the BS. As will be described in more detail herein, a base station may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive an indication of a repetition factor associated with a message or an indication that demodulation reference signal (DMRS) bundling is to be applied for the message for joint channel estimation; and communicate a phase tacking reference signal (PTRS) associated with the message based at least in part on receiving the indication of the repetition factor or the indication that DMRS bundling is to be applied.

In some aspects, a base station for wireless communication includes a memory and one or more processors, coupled to the memory, configured to: transmit an indication of a repetition factor associated with a message or an indication that DMRS bundling is to be applied for the message for joint channel estimation; and communicate a PTRS associated with the message based at least in part on transmitting the indication of the repetition factor or the indication that DMRS bundling is to be applied.

In some aspects, a method of wireless communication performed by a UE includes receiving an indication of a repetition factor associated with a message or an indication that DMRS bundling is to be applied for the message for joint channel estimation; and communicating a PTRS associated with the message based at least in part on receiving the indication of the repetition factor or the indication that DMRS bundling is to be applied.

In some aspects, a method of wireless communication performed by a base station includes transmitting an indication of a repetition factor associated with a message or an indication that DMRS bundling is to be applied for the message for joint channel estimation; and communicating a PTRS associated with the message based at least in part on transmitting the indication of the repetition factor or the indication that DMRS bundling is to be applied.

In some aspects, a non-transitory computer-readable medium storing a set of instructions for wireless communication includes one or more instructions that, when executed by one or more processors of a UE, cause the UE to: receive an indication of a repetition factor associated with a message or an indication that DMRS bundling is to be applied for the message for joint channel estimation; and communicate a PTRS associated with the message based at least in part on receiving the indication of the repetition factor or the indication that DMRS bundling is to be applied.

In some aspects, a non-transitory computer-readable medium storing a set of instructions for wireless communication includes one or more instructions that, when executed by one or more processors of a base station, cause the base station to: transmit an indication of a repetition factor associated with a message or an indication that DMRS bundling is to be applied for the message for joint channel estimation; and communicate a PTRS associated with the message based at least in part on transmitting the indication of the repetition factor or the indication that DMRS bundling is to be applied.

In some aspects, an apparatus for wireless communication includes means for receiving an indication of a repetition factor associated with a message or an indication that DMRS bundling is to be applied for the message for joint channel estimation; and means for communicating a PTRS associated with the message based at least in part on receiving the indication of the repetition factor or the indication that DMRS bundling is to be applied.

In some aspects, an apparatus for wireless communication includes means for transmitting an indication of a repetition factor associated with a message or an indication that DMRS bundling is to be applied for the message for joint channel estimation; and means for communicating a PTRS associated with the message based at least in part on transmitting the indication of the repetition factor or the indication that DMRS bundling is to be applied.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
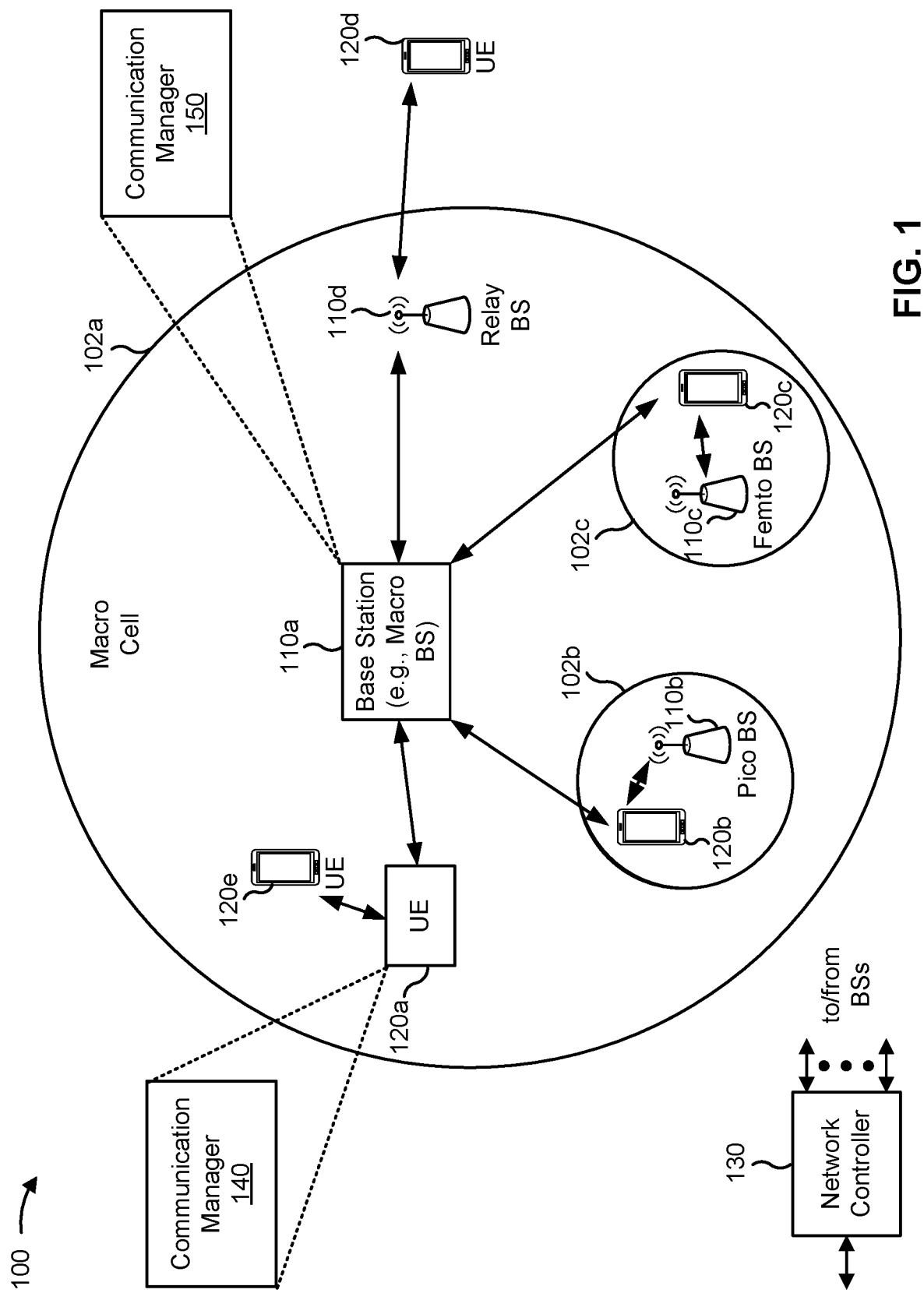
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive an indication of a repetition factor associated with a message or an indication that demodulation reference signal (DMRS) bundling is to be applied for the message for joint channel estimation; and communicate a phase tracking reference signal (PTRS) associated with the message based at least in part on receiving the indication of the repetition factor or the indication that DMRS bundling is to be applied. Additionally, or alternatively, the communication manager 140 may perform one or more other operations described herein.

In some aspects, the base station 110 may include a communication manager 150. As described in more detail elsewhere herein, the communication manager 150 may transmit an indication of a repetition factor associated with a message or an indication that DMRS bundling is to be applied for the message for joint channel estimation; and communicate a PTRS associated with the message based at least in part on transmitting the indication of the repetition factor or the indication that DMRS bundling is to be applied. Additionally, or alternatively, the communication manager 150 may perform one or more other operations described herein.

As indicated above, FIG. 1 is provided as an example. Other examples may differ from what is described with regard to FIG. 1.

Figure 2:
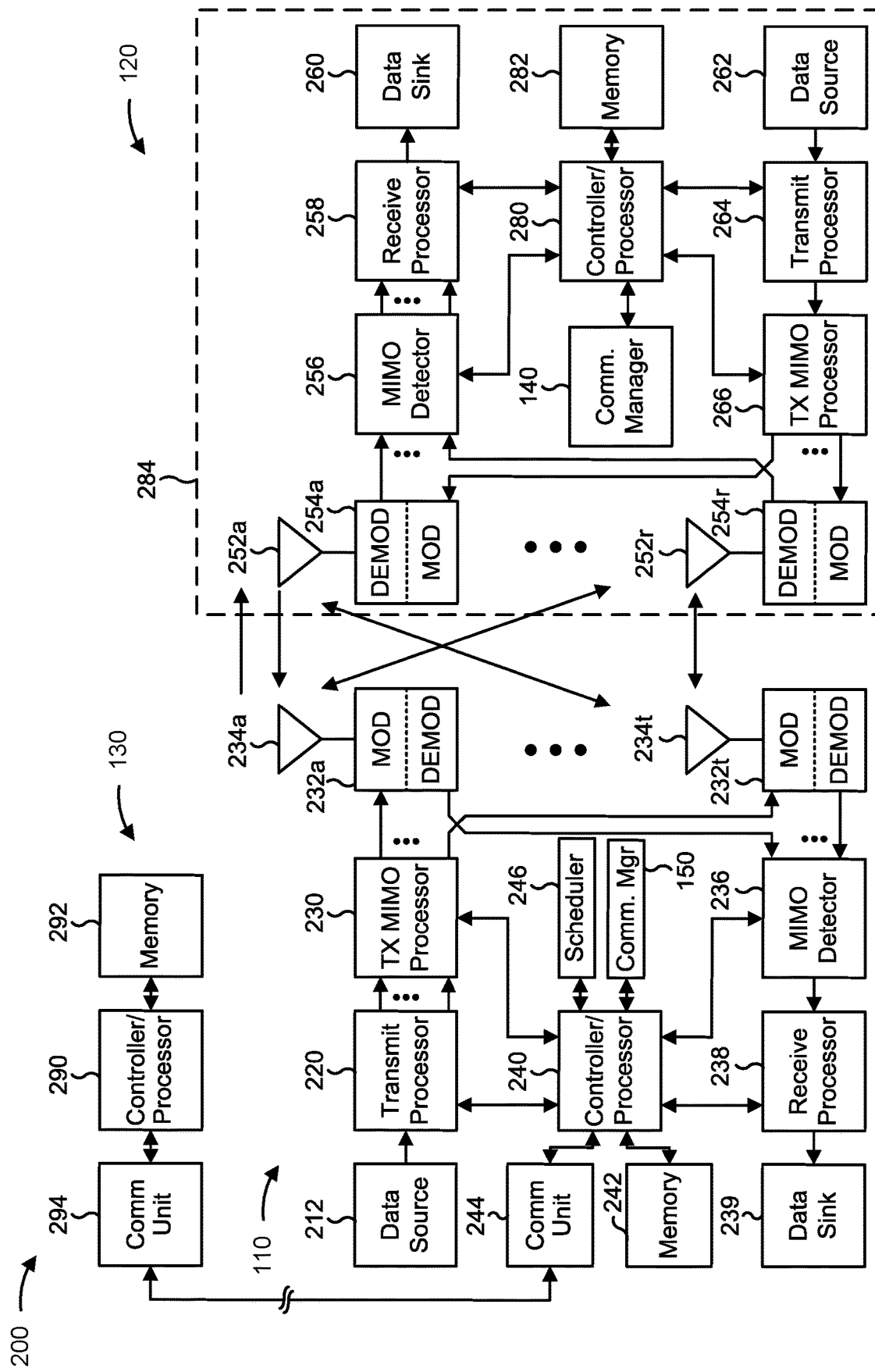
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with PTRS activation based on repetition indication or DMRS bundling indication, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE 120 includes means for receiving an indication of a repetition factor associated with a message or an indication that DMRS bundling is to be applied for the message for joint channel estimation; and/or means for communicating a PTRS associated with the message based at least in part on receiving the indication of the repetition factor or the indication that DMRS bundling is to be applied. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, and/or memory 282.

In some aspects, the base station 110 includes means for transmitting an indication of a repetition factor associated with a message or an indication that DMRS bundling is to be applied for the message for joint channel estimation; and/or means for communicating a PTRS associated with the message based at least in part on transmitting the indication of the repetition factor or the indication that DMRS bundling is to be applied. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a PTRS, among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random quadrature phase shift keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
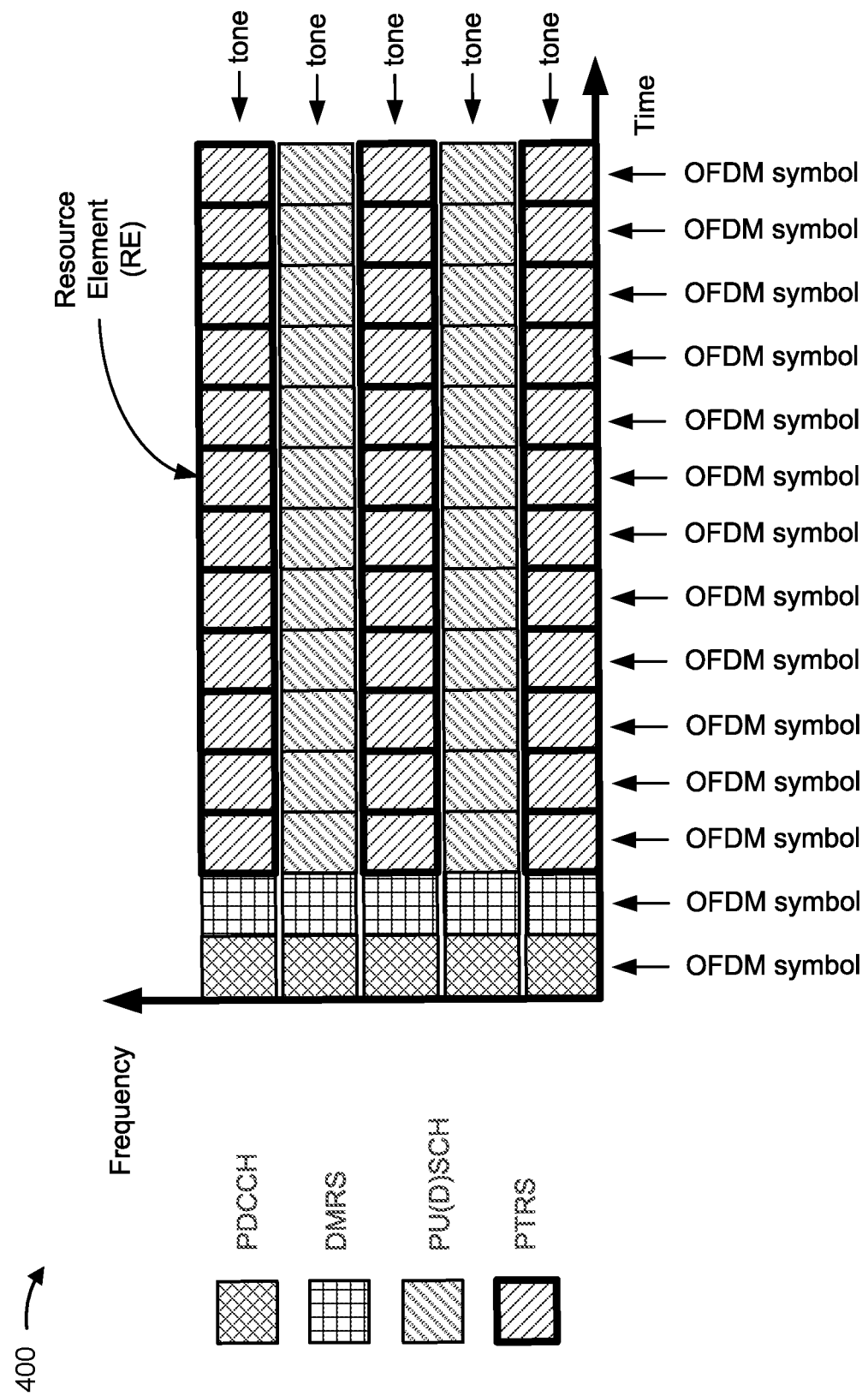
FIG. 4 is a diagram illustrating an example of an assignment of phase tracking reference signals (PTRSs) and other signals and channels to resource elements, in accordance with the present disclosure.

FIG. 4 is a diagram illustrating an example 400 of an assignment of PTRSs and other signals and channels to resource elements, in accordance with the present disclosure.

FIG. 4 illustrates PTRS pilot signals (also referred to as PTRS pilot tones) for an orthogonal frequency division multiplexing with a cyclic prefix (CP-OFDM) communication system. PTRS pilot signals may be continuous (as illustrated) or discontinuous in the time domain. For a UE 120, the PTRS signals may occupy one tone or several tones, based at least in part on a scheduled bandwidth, a frequency domain resource allocation size (e.g., a resource block (RB) allocation size), an MCS, a signal-to-noise ratio (SNR), an interference level, a port mapping, and/or another attribute that may impact the received signal quality of communication signals. A tone may be referred to as a subcarrier or a resource element (RE) in the frequency domain.

PTRS pilot signals may be used by the UE 120 and/or the base station 110 for phase tracking, for phase estimation, and/or to correct oscillator phase noise, such as for millimeter wave communications. A PTRS may be embedded in a PDSCH resource allocation or a PUSCH allocation. In some cases, up to two PTRS ports may be configured for downlink communication (e.g., within a PDSCH resource allocation), and up to two PTRS ports may be configured for uplink communication (e.g., within a PUSCH resource allocation). For CP-OFDM communication, a PTRS may use the same sequence as a corresponding DMRS, which may be a Gold sequence (e.g., a QPSK modulated Gold sequence). In some aspects, a correspondence between a PTRS port and a DMRS port may be indicated to the UE by a base station (e.g., via a DMRS-PTRS association indicated in downlink control information). In some cases, for uplink communications, a greater number of DMRS ports (e.g., up to 4 DMRS ports) may be configured for a UE than a number of PTRS ports (e.g., up to 2 PTRS ports) configured for the UE. For example, for a given RB, if PTRS is enabled or present, one PTRS port may be mapped to one subcarrier carrying one or more DMRS ports (e.g., of a DMRS port group corresponding to the PTRS port, as indicated in a DMRS-PTRS association).

A higher SNR in the PTRS pilot signals may provide a more accurate phase error estimation. Accordingly, in some aspects, the PTRS pilot signals may be located in the tones with good channel conditions, high SNR, and/or high signal-to-interference-plus-noise ratio (SINR), which may result in more accurate phase tracking at the UE 120. Increasing the number of PTRS pilot signals may provide more accurate phase error estimation. For example, an increased number of PTRS pilot signals may allow for thermal noise to be averaged out over the larger number of PTRS pilot signals. Additionally, an increased number of PTRS pilot signals may allow for frequency diversity to be exploited.

However, using a large number of PTRS pilot signals may increase overhead. Furthermore, the gain from increasing the number of PTRS pilot signals may saturate for a given number of PTRS pilot signals in a scheduled bandwidth. Accordingly, UEs 120 with a large scheduled bandwidth may use a sparser PTRS frequency domain pattern. Conversely, UEs 120 with a small scheduled bandwidth may use a denser PTRS frequency domain pattern. PTRS may be relatively sparse in frequency compared to DMRS. For example, one PTRS RE may be used in every 2 or 4 RBs, while 4 or 6 DMRS REs may be used in every RB. As shown in FIG. 4, PTRS may be relatively dense in time as compared to DMRS.

The required number of PTRS pilot signals to achieve a certain performance requirement (e.g., a bit error rate less than 0.5%, 1%, 2%, or another threshold), for a given scheduled bandwidth may depend on a number of factors, such as channel conditions, UE speed, UE capability, UE processing power, UE battery charge, mobility, and other factors that may impact a communication system's performance. A communication system with too few PTRS signals may result in more retransmissions due to channel errors, which reduces throughput. A system with too many PTRS signals may utilize valuable system bandwidth for a minimal decrease in channel error rate.

Some communication systems may use a fixed PTRS pattern (e.g., in the time domain and/or frequency domain), such as the PTRS pattern shown in FIG. 4. In this case, the density of PTRS pilot signals may be fixed both in the number of PTRS pilot signals and the resource elements that carry PTRS pilot signals. Alternatively, some communication systems may use a flexible PTRS configuration, where resource elements carrying PTRS pilot tones may be flexibly configured.

In some cases, a radio resource control (RRC) configuration may indicate one or more density tables. For example, an RRC configuration may indicate a PTRS time domain density table and a PTRS frequency domain density table. The RRC configuration may indicate a first set of thresholds for the PTRS time domain density table and a second set of thresholds for the PTRS frequency domain density table. In some examples, the first set of thresholds and the second set of thresholds may be defined (e.g., in an RRC configuration) independently for each configured bandwidth part (e.g., using dedicated RRC signaling for uplink and downlink). In some cases, a UE may report one or more threshold values to the base station. For example, for a given carrier frequency, the UE may report (e.g., using UE capability information or UE capability signaling) one or more threshold values (for the first set of thresholds and/or the second set of thresholds) for each subcarrier spacing applicable to a data channel at the carrier frequency. For example, the UE may determine the one or more threshold values (for the first set of thresholds and/or the second set of thresholds) based on phase noise characteristics at the different subcarrier spacings (e.g., assuming an MCS with a highest modulation order, among MCSs supported by the UE, is used).

In some cases, the PTRS time domain density table may indicate different time domain densities for PTRSs, where the time domain density is based on an MCS used for a data communication. In other words, a time domain density for a PTRS may be a function of a scheduled MCS for a data communication. The time domain density may indicate an offset between OFDM symbols that are to be PTRS symbols in the time domain (e.g., a time domain density of 4 may indicate that every $4^{th}$ OFDM symbol is to be a PTRS symbol and a time domain density of 2 may indicate that every $2^{nd}$ OFDM symbol is to be a PTRS symbol). The first set of thresholds for the PTRS time domain density table may indicate a set of MCS indices. For example, an MCS table (e.g., defined, or otherwise fixed, by a wireless communication standard, such as the 3GPP) may indicate an index value for different MCSs. The MCS table may indicate, for each MCS index value, a modulation order, a code rate (e.g., a target code rate), and/or a spectral efficiency for an MCS. The first set of thresholds for the PTRS time domain density table may be based on an MCS table that is being used by the UE. For example, a base station may indicate a first MCS threshold value (ptrs-MCS1) indicating a first MCS index, a second MCS threshold value (ptrs-MCS2) indicating a second MCS index, a third MCS threshold value (ptrs-MCS3) indicating a third MCS index, and/or a fourth MCS threshold value (ptrs-MCS4) indicating a fourth MCS index, among other examples. An example PTRS time domain density table is shown below by Table 1.

TABLE 1

| Scheduled MCS | Time Density |
| --- | --- |
| MCS < ptrs-MCS1 | PTRS is not present |
| ptrs-MCS1 ≤ MCS < ptrs-MCS2 | 4 |
| ptrs-MCS2 ≤ MCS < ptrs-MCS3 | 2 |
| ptrs-MCS3 ≤ MCS < ptrs-MCS4 | 1 |

As shown in Table 1, if the scheduled MCS (e.g., an MCS the UE is indicated to use for a data communication) is between the first MCS threshold value (ptrs-MCS1) and the second MCS threshold value (ptrs-MCS2), then the time domain density for the PTRS may be 4 (e.g., indicating that every $4^{th}$ symbol is a PTRS symbol. If the scheduled MCS has an index value that is less than the first MCS threshold value, then the UE may assume that a PTRS is not to be transmitted. As shown in Table 1, as an index value of the scheduled MCS increases, a number of symbols that are to be PTRS symbols increases (e.g., from every $4^{th}$ symbol, to every $2^{nd}$ symbol, to every symbol). A frequency domain density may indicate a number of subcarriers or tones that are to be PTRS symbols in a time domain allocation for a PTRS (e.g., a time domain density of 4 may indicate that every $4^{th}$ symbol is to be a PTRS symbol and a time domain density of 2 may indicate that every $2^{nd}$ symbol is to be a PTRS symbol).

In some cases, a PTRS frequency domain density table may indicate different frequency domain densities for PTRSs, where the frequency domain density is based on a scheduled bandwidth (e.g., a number of RBs allocated) for a data communication. In other words, a frequency domain density for a PTRS may be a function of a scheduled bandwidth for a data communication. A frequency domain density may indicate an offset between resource blocks that include a PTRS subcarrier in the frequency domain (e.g., a frequency domain density of 4 may indicate that every $4^{th}$ resource block is to include one PTRS subcarrier or tone and a frequency domain density of 2 may indicate that every $2^{nd}$ resource block is to include one PTRS subcarrier or tone). The second set of thresholds for the PTRS frequency domain density table may indicate a set of RB threshold values. For example, a base station may indicate (e.g., in an RRC configuration) a first RB threshold value (NRB1) and a second RB threshold value (NRB2), among other examples. An example PTRS frequency domain density table is shown below by Table 2.

TABLE 2

| Scheduled Bandwidth ($N_{RB}$) | Frequency Density |
|---|---|
| $N_{RB} < N_{RB1}$ | PTRS is not present |
| $N_{RB1} \leq N_{RB} < N_{RB2}$ | 2 |
| $N_{RB2} \leq N_{RB}$ | 4 |

As shown in Table 2, if the scheduled bandwidth is between the first RB threshold value (NRB1) and the second RB threshold value (NRB2), then the frequency domain density for the PTRS may be 2 (e.g., indicating that every $2^{nd}$ resource block is to include one PTRS subcarrier or tone). If the scheduled bandwidth is greater than or equal to the second RB threshold value (NRB2), then the frequency domain density for the PTRS may be 4 (e.g., indicating that every $4^{th}$ resource block is to include one PTRS subcarrier or tone). If the scheduled bandwidth is less than the first RB threshold value (NRB1), then the UE may assume that a PTRS is not to be transmitted. As shown in Table 2, the frequency domain density of a PTRS may decrease as a size of a scheduled bandwidth (e.g., a number of scheduled resource blocks) increases.

In some cases, the base station may indicate a presence of a PTRS (e.g., indicate that PTRSs may be transmitted) using a higher layer parameter (e.g., an RRC parameter). For example, the base station may enable the presence of PTRSs in uplink communication and/or in downlink communications using one or more higher layer parameters. For example, the base station may indicate that PTRSs are enabled for downlink communications using a first parameter (e.g., a DL-PTRS-present information element in an RRC configuration). Similarly, the base station may indicate that PTRSs are enabled for uplink communications using a second parameter (e.g., a UL-PTRS-present information element in an RRC configuration). If the base station has not configured the higher layer parameter to indicate that PTRSs are present or enabled, the UE may assume that PTRSs are not to be transmitted for uplink communications and/or downlink communications. If the base station configures the higher layer parameter to indicate that PTRSs are present or enabled, then the UE may transmit (e.g., for uplink communications) or receive (e.g., for downlink communications) PTRSs in accordance with the time domain density and frequency domain density of the PTRS (e.g., determined using one or more tables, as described above). In other words, the presence or activation of PTRSs for a channel may be based only on the higher layer parameter configured by the base station 110 (e.g., using RRC signaling).

As indicated above, FIG. 4 is provided as an example. Other examples may differ from what is described with regard to FIG. 4.

In some cases, a transmitter, such as a UE 120 or a base station 110, may transmit one or more DMRSs to a receiver, such as another UE 120 or base station 110. The design and mapping of a DMRS may be specific to a physical channel for which the DMRS is used for estimation. DMRSs are used for both downlink communications and uplink communications. The receiver may perform one or more measurements of the DMRS to estimate a physical channel on which one or more communications are transmitted from the transmitter. In this way, the receiver may determine whether a channel quality of the physical channel satisfies one or more channel quality thresholds and may use the results from the one or more measurements to facilitate demodulation of the communications transmitted on the physical channel.

In some cases, the transmitter and/or receiver may support bundling of DMRSs in the time domain across one or more time slots. "DMRS bundling" may refer to bundling or grouping the same or coherent (phase coherent) DMRSs that are transmitted at different points over time for channel estimation purposes. That is, when DMRS bundling is configured or indicated, the receiver may perform joint or aggregated channel estimation based on DMRS(s) received across multiple slots, as opposed to performing channel estimation separately for each individual slot based on the DMRS(s) received in that slot. DMRS bundling may be referred to herein as DMRS aggregation or joint channel estimation. DMRS bundling enables the receiver to perform joint channel estimation on the DMRS in multiple time slots to improve an accuracy of channel estimation.

For DMRS bundling to be supported, the transmitter may be required to maintain a phase continuity or phase coherence among the DMRSs transmitted by the transmitter. "Phase continuity" or "phase coherence" may refer to the transmitter maintaining a radio frequency (RF) phase after modulation among multiple transmissions (e.g., among multiple DMRSs) over time. For example, to maintain continuity or phase coherence among DMRSs, the transmitter may maintain a consistency in a phase relationship among multiple DMRSs transmitted in different time slots. Phase continuity or phase coherence among the DMRSs transmitted by the transmitter may be required for DMRS bundling to allow the receiver to aggregate or bundle the DMRSs to perform joint channel estimation based on DMRS(s) received across multiple slots. A failure to maintain phase continuity or phase coherence among the DMRSs may result in the receiver being unable to perform a channel estimation, or may result in an inaccurate channel estimation, when applying DMRS bundling.

Additionally, in some cases, a transmitter may transmit one or more repetitions of a communication. A repetition, such as an uplink repetition or a downlink repetition, may be used to improve reliability, such as for ultra-reliable low latency communication (URLLC) or for UEs located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. In some cases, a transmitter may be configured or indicated to transmit multiple repetitions of a communication over time and/or across different time slots. As used herein, "repetition" is used to refer to the initial communication and is also used to refer to a repeated transmission of the initial communication. In a similar manner as described above, it may be beneficial for the transmitter to maintain a phase continuity or phase coherence among the repetitions to improve channel estimation and/or performance at the receiver. For example, in some cases, where joint channel estimation is applied, a base station may only indicate that repetitions are to be transmitted for a message and may not indicate that joint channel estimation (e.g., DMRS bundling) is to be applied. However, in some cases, a UE (e.g., that is a transmitter) may be unable to support or maintain phase continuity or phase coherence across the multiple repetitions or across DMRSs transmitted by the UE (e.g., due to a lack of capability of the UE or an RF hardware configuration of the UE). As a result, a UE may not maintain phase continuity or phase coherence across the multiple repetitions or the multiple DMRSs, resulting in degraded performance at the base station, such as the base station being unable to perform a channel estimation, or resulting in an inaccurate channel estimation, by applying DMRS bundling among DMRSs or repetitions transmitted by the UE that have different phases.

As described in more detail elsewhere herein, a PTRS may be used by a receiver (e.g., a base station or a UE) for phase tracking, for phase estimation, and/or to correct oscillator phase noise. Therefore, a receiver may be enabled to track phase shifts over multiple transmissions using PTRSs and may apply a correction factor to compensate for the phase shifts to improve communication performance or channel estimation accuracy. However, PTRSs are configured and/or enabled to be transmitted using higher layer parameters, such as a parameter in an RRC configuration. In some cases, DMRS bundling and/or repetitions of a communication may be dynamically indicated. Therefore, a transmitter may not be configured or enabled to transmit a PTRS when the transmitter is configured to transmit repetitions of a communication and/or when DMRS bundling is configured (e.g., because the PTRSs may be semi-statically configured, whereas DMRS bundling and/or repetitions may be dynamically indicated). Moreover, PTRSs may be typically configured for higher frequency bands, such as millimeter wave bands or FR2 bands. Therefore, PTRSs may not be configured or enabled when a UE and a base station are communicating using the lower frequency bands. However, repetitions of communications and/or DMRS bundling may be applied at lower frequency bands, such as an FR1 band. As a result, the receiver may not be enabled to track phase shifts of transmissions by the transmitter over time, resulting in degraded communication performance and/or inaccurate channel estimations (e.g., when applying DMRS bundling), among other examples.

Some techniques and apparatuses described herein enable PTRS activation based at least in part on a repetition indication or a DMRS bundling indication. For example, PTRSs may be activated conditioned on having repetitions of a communication and/or on DMRS bundling being applied among repetitions of a communication. For example, a UE may receive, for a message (e.g., an uplink message or a downlink message), an indication of a repetition factor (e.g., indicating a number of repetitions for the message) and/or an indication that DMRS bundling is to be applied for the message for joint channel estimation. The UE may determine that PTRSs are activated or are enabled for the message based at least in part on receiving the indication that the message is to be associated with one or more repetitions and/or DMRS bundling. The UE may communicate (e.g., transmit if the message is an uplink message or receive if the message is a downlink message) a PTRS associated with the message based at least in part on receiving the indication of the repetition factor or the indication that DMRS bundling is to be applied.

As a result, the UE and/or the base station may be enabled to transmit a PTRS based at least in part on repetitions of a message and/or DMRS bundling for the message being indicated. Therefore, a base station may be enabled to track phase shifts over different transmissions using PTRSs. As a result, the base station may be enabled to compensate for phase shifts or phase jumps across transmissions by a UE. Therefore, the base station may improve communication performance and/or improve an accuracy of joint channel estimations based at least in part on tracking phase shifts over different transmissions using PTRSs and compensating for the phase shifts. Moreover, this reduces a signaling overhead that would have otherwise been present if the base station were to dynamically activate PTRSs each time that a message is to be associated with repetitions and/or DMRS bundling across repetitions.

Figure 5:
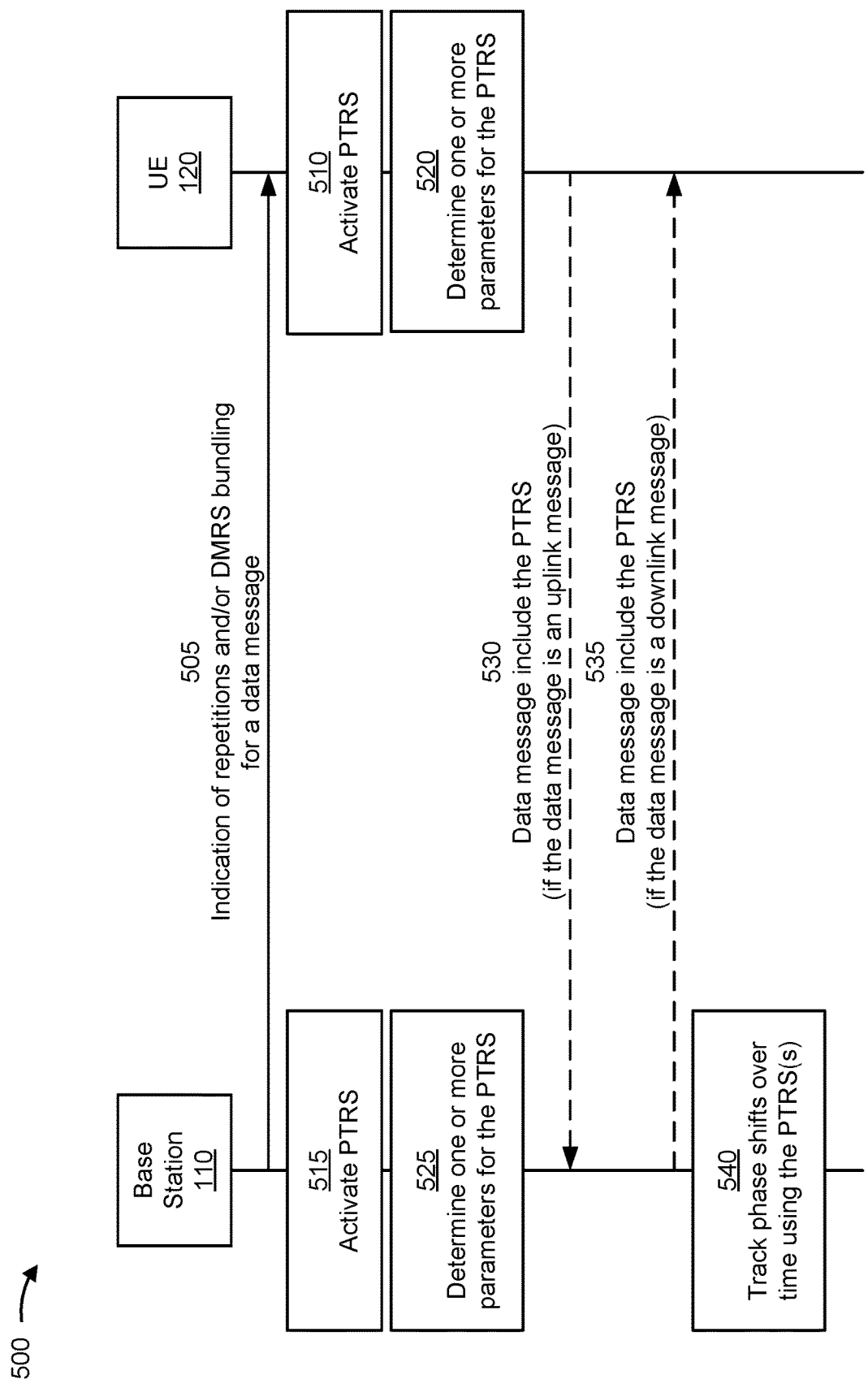
FIG. 5 is a diagram illustrating an example associated with PTRS activation based at least in part on a repetition indication or a demodulation reference signal (DMRS) bundling indication, in accordance with the present disclosure.

FIG. 5 is a diagram illustrating an example 500 associated with PTRS activation based at least in part on a repetition indication or a DMRS bundling indication, in accordance with the present disclosure. As shown in FIG. 5, a base station 110 and a UE 120 may communicate with one another in a wireless network, such as the wireless network 100.

As shown by reference number 505, the base station 110 may transmit, and the UE 120 may receive, an indication of a repetition factor associated with a message or an indication that DMRS bundling is to be applied for the message for joint channel estimation (e.g., that DMRS bundling is to be applied across repetitions of the message). For example, the base station 110 may transmit DCI that indicates that the message is to be repeated one or more times (e.g., indicated by the repetition factor). Additionally, or alternatively, the base station 110 may transmit DCI that indicates that DMRS bundling is to be applied across repetitions of the message. In some aspects, the message may be an uplink message (e.g., an uplink data message, such as PUSCH message). In some other aspects, the message may be a downlink message (e.g., a downlink data message, such as a PDSCH message).

As shown by reference number 510, the UE 120 may activate PTRSs for the channel based at least in part on receiving the indication of the repetition factor associated with the message and/or the indication that DMRS bundling is to be applied for the message. For example, the UE 120 may activate a PTRS presence field or information element to indicate that PTRSs are enabled for the message based at least in part on receiving the indication of the repetition factor or the indication that DMRS bundling is to be applied. For example, the PTRS presence field or information element may be the DL-PTRS-present information element (e.g., if the message is a downlink message) or the UL-PTRS-present information element (e.g., if the message is an uplink message). In other words, the UE 120 may set a value of the PTRS presence field or information element to a value (e.g., a value of "1" or another value or entry) that indicates that PTRSs are enabled or activated for the channel (e.g., the uplink channel or the downlink channel) based at least in part on receiving the indication of the repetition factor or the indication that DMRS bundling is to be applied. For example, a scheduling grant for a message (e.g., a DCI message) may indicate that the message is to be transmitted with repetitions and/or that DMRS bundling is to be applied across repetitions of the message. The reception of the scheduling grant by the UE 120 may cause the UE 120 to modify a PTRS presence field or information element from indicating that PTRSs are not present or enabled for the channel to indicating that PTRSs are present or enabled for the channel.

In some aspects, the UE 120 may activate the PTRS only for repetitions or copies of the message that are not associated with a DMRS or that are associated with a DMRS density that is less than a DMRS density threshold. For example, in some aspects, different copies or different repetitions of the message may be associated with different DMRS densities. Additionally, or alternatively, some copies or some repetitions of the message may not include a DMRS. As described in more detail elsewhere herein, DMRSs may aid in phase tracking and/or channel estimation for data messages. Therefore, the UE 120 may activate the PTRS only for repetitions or copies of the message that are not associated with a DMRS or that are associated with a DMRS density that is less than a DMRS density threshold to improve phase tracking for those repetitions or copies. In some aspects, the base station 110 may indicate the UE 120 is to activate the PTRS only for repetitions or copies of the message that are not associated with a DMRS or that are associated with a DMRS density that is less than a DMRS density threshold (e.g., in an RRC configuration). Additionally, or alternatively, a wireless communication standard (such as the 3GPP) may define, or otherwise fix, a rule that indicates that the UE 120 is to activate the PTRS only for repetitions or copies of the message that are not associated with a DMRS or that are associated with a DMRS density that is less than a DMRS density threshold.

As shown by reference number 515, the base station 110 may activate PTRSs for the channel based at least in part on transmitting the indication of the repetition factor associated with the message and/or the indication that DMRS bundling is to be applied for the message, in a similar manner as described in connection with reference number 510. For example, the base station 110 may activate a PTRS presence field or information element (e.g., the DL-PTRS-present information element or the UL-PTRS-present information element) to indicate that PTRSs are enabled or are present for the message and/or channel based at least in part on transmitting the indication of the repetition factor or the indication that DMRS bundling is to be applied. Additionally, the base station 110 may activate the PTRS only for repetitions or copies of the message that are not associated with a DMRS or that are associated with a DMRS density that is less than a DMRS density threshold, in a similar manner as described elsewhere herein.

As a result, the UE 120 and the base station 110 may be enabled to dynamically activate the presence of a PTRS for a channel (e.g., by dynamically activating the PTRS using a PTRS presence field or information element that would have otherwise been semi-statically configured, such as by RRC signaling) based at least in part on transmitting or receiving the indication of the repetition factor or the indication that DMRS bundling is to be applied.

In some aspects, the UE 120 and/or the base station 110 may activate the PTRS for the channel (e.g., based at least in part on the indication of the repetition factor or the indication that DMRS bundling is to be applied) based at least in part on one or more trigger conditions being satisfied. For example, the one or more trigger conditions may include a trigger condition associated with at least one of a frequency range, a frequency band, or a subcarrier spacing. For example, in some aspects, the UE 120 and/or the base station 110 may activate the PTRS for the channel (e.g., based at least in part on the indication of the repetition factor or the indication that DMRS bundling is to be applied) only for some frequency ranges, for some frequency bands, and/or for some subcarrier spacings.

In some aspects, the one or more trigger conditions may include a trigger condition associated with a spectrum configuration associated with the message. For example, the spectrum configuration may indicate that the spectrum is a paired spectrum (e.g., that the spectrum is a time division duplexing (TDD) spectrum) or may indicate that the spectrum is an unpaired spectrum (e.g., that the spectrum is a frequency division duplexing (FDD) spectrum). For example, in a TDD spectrum, a slot pattern may indicate time gaps between uplink slots (e.g., between slots that are configured for uplink communications) and/or time gaps between downlink slots (e.g., between slots that are configured for downlink communications). In some aspects, in an FDD spectrum, there may not be time gaps between uplink slots and/or time gaps between downlink slots. As described elsewhere herein, it may be difficult for a UE 120 to maintain phase coherence or phase continuity over longer periods of time and/or over time gaps. Therefore, a trigger condition may indicate that the UE 120 and/or the base station 110 are to activate the PTRS for the channel (e.g., based at least in part on the indication of the repetition factor or the indication that DMRS bundling is to be applied) when the spectrum configuration indicates a paired spectrum or a TDD spectrum. In some aspects, a trigger condition may indicate that the UE 120 and/or the base station 110 are not to activate the PTRS for the channel (e.g., based at least in part on the indication of the repetition factor or the indication that DMRS bundling is to be applied) when the spectrum configuration indicates an unpaired spectrum or an FDD spectrum.

As shown by reference number 520, the UE 120 may determine one or more parameters for the PTRS. Similarly, as shown by reference number 525, the base station 110 may determine the one or more parameters for the PTRS. For example, the one or more parameters may include a time domain resource density, a frequency domain resource density, a time domain resource starting location (e.g., a starting symbol for the PTRS), and/or a frequency domain resource starting location (e.g., a starting RB for the PTRS), among other examples. In some aspects, the UE 120 and/or the base station 110 may determine and/or identify the one or more parameters based at least in part on the scheduling grant for the message. For example, the UE 120 may receive DCI scheduling the message. As described elsewhere herein, the DCI may indicate that the message is associated with repetitions and/or may indicate that DMRS bundling is to be applied across repetitions of the message. Additionally, the DCI may indicate one or more one or more parameters for the PTRS. For example, the DCI may indicate a time domain resource density for the PTRS, a frequency domain resource density for the PTRS, a time domain resource starting location for the PTRS, and/or a frequency domain resource starting location PTRS, among other examples. In other words, the scheduling grant for the message may explicitly indicate one or more parameters for the PTRS. The base station 110 may determine the one or more parameters for the PTRS and may indicate the one or more parameters for the PTRS in the scheduling grant (e.g., in DCI) for the message.

Additionally, or alternatively, the UE 120 and/or the base station 110 may determine one or more parameters associated with the PTRS based at least in part on one or more parameters associated with the message. The one or more parameters associated with the message may include an MCS, a bandwidth (e.g., a number of RBs allocated for the message), a number of repetitions, a DMRS pattern, and/or a DMRS density, among other examples. For example, the UE 120 and/or the base station 110 may determine a time domain resource density for the PTRS based at least in part on the MCS to be used for the message (e.g., in a similar manner as described in connection with FIG. 4). As another example, the UE 120 and/or the base station 110 may determine a frequency domain resource density of the PTRS based at least in part on the scheduled bandwidth (e.g., the number of RBs allocated for) the message (e.g., in a similar manner as described in connection with FIG. 4).

In some aspects, the UE 120 and/or the base station 110 may determine one or more parameters associated with the PTRS based at least in part on the one or more parameters associated with the message and one or more rules. For example, if a number of repetitions associated with the message is greater than or equal to a first threshold value, then the UE 120 and/or the base station 110 may determine that the density (e.g., the time domain resource density and/or the frequency domain resource density) of the PTRS is to be increased. For example, a higher number of repetitions of a message may increase a difficulty to maintain phase coherence or phase continuity across the repetitions by the UE 120. Therefore, the UE 120 and/or the base station 110 may determine that the density (e.g., the time domain resource density and/or the frequency domain resource density) of the PTRS is to be increased when the number of repetitions associated with the message is greater than or equal to the first threshold value to improve phase tracking across the repetitions.

As another example, if a density or pattern of the DMRS for the message indicates that the density of the DMRS is less than or equal to a second threshold value, then the UE 120 and/or the base station 110 may determine that the density (e.g., the time domain resource density and/or the frequency domain resource density) of the PTRS is to be increased. For example, as described in more detail elsewhere herein, DMRSs may aid in phase tracking and/or channel estimation for data messages. However, when a density (e.g., a time domain resource density and/or a frequency domain resource density) of the DMRS for the message is low, a density of the PTRS may be increased to improve phase tracking. Therefore, the UE 120 and/or the base station 110 may determine that the density (e.g., the time domain resource density and/or the frequency domain resource density) of the PTRS is to be increased when the density of the DMRS for the message is less than or equal to a second threshold value to improve phase tracking across the repetitions.

In some aspects, the UE 120 and/or the base station 110 may determine that parameters for the PTRS may be different for different repetitions or different copies of the message. For example, as described elsewhere herein, in some aspects, different copies or different repetitions of the message may be associated with different DMRS densities. Additionally, or alternatively, some copies or some repetitions of the message may not include a DMRS. Therefore, the UE 120 and/or the base station 110 may determine a first set of parameters for the PTRS for the repetitions or copies of the message that are not associated with a DMRS or that are associated with a DMRS density that is less than a DMRS density threshold (e.g., the DMRS density threshold may be the same threshold as the DMRS density threshold described elsewhere herein or may be a different threshold than the DMRS density threshold described elsewhere herein). The UE 120 and/or the base station 110 may determine a second set of parameters for the PTRS for the repetitions or copies of the message that are associated with a DMRS or that are associated with a DMRS density that is greater than or equal to the DMRS density threshold. For example, the UE 120 and/or the base station 110 may determine a first PTRS resource allocation density (e.g., time domain density and/or frequency domain density) for repetitions or copies of the message that are not associated with a DMRS or that are associated with a DMRS density that is less than the DMRS density threshold. The UE 120 and/or the base station 110 may determine a second PTRS resource allocation density (e.g., time domain density and/or frequency domain density) for repetitions or copies of the message that are associated with a DMRS or that are associated with a DMRS density that is greater than or equal to the DMRS density threshold.

In some aspects, the first PTRS resource allocation density may be greater than the second PTRS resource allocation density. For example, the UE 120 and/or the base station 110 may determine that repetitions or copies of the message that are not associated with a DMRS or that are associated with a DMRS density that is less than the DMRS density threshold are to be associated with a higher PTRS resource allocation density than a PTRS resource allocation for repetitions or copies of the message that are associated with a DMRS or that are associated with a DMRS density that is greater than or equal to the DMRS density threshold. In other words, rather than only transmitting a PTRS for repetitions or copies of the message that are not associated with a DMRS or that are associated with a DMRS density that is less than the DMRS density threshold, the UE 120 and/or the base station 110 may determine that the PTRS resource allocation density for those repetitions or copies of the message is to be increased to improve phase tracking. Additionally, the UE 120 and/or the base station 110 may determine that the PTRS resource allocation density for repetitions or copies of the message that are associated with a DMRS or that are associated with a DMRS density that is greater than or equal to the DMRS density threshold is to be decreased (e.g., compared to the PTRS resource allocation for the repetitions or copies of the message that are not associated with a DMRS or that are associated with a DMRS density that is less than the DMRS density threshold) to conserve resources.

As a result, parameters for the PTRS may be implicitly determined or conditioned on parameters for the message. For example, a density (e.g., the time domain resource density and/or the frequency domain resource density) of the PTRS may be based at least in part on a number of repetitions associated with the message, a DMRS pattern associated with the message, and/or a DMRS density associated with the message.

In some aspects, the UE 120 and/or the base station 110 may determine that a resource allocation density for the PTRS is to be non-uniform. For example, the UE 120 and/or the base station 110 may determine a first PTRS resource allocation density for a first subset of symbols of a set of symbols associated with a time domain resource allocation for the message. The UE 120 and/or the base station 110 may determine a second PTRS resource allocation density for a second subset of symbols of the set of symbols. In some aspects, the first resource allocation density is greater than the second resource allocation density, and the first subset of symbols is associated with an edge of the time domain resource allocation for the PTRS. "Edge of the time domain resource allocation" may refer to one or more symbols at a start of the time domain resource allocation and/or one or more symbols at an end of the time domain resource allocation.

For example, the UE 120 and/or the base station 110 may determine that a PTRS resource allocation density (e.g., a time domain resource allocation density and/or a frequency domain resource allocation density) is to be higher at an edge of the time domain resource allocation for the message. For example, have a higher PTRS resource allocation density (e.g., a time domain resource allocation density and/or a frequency domain resource allocation density) at a start and/or an end of the time domain resource allocation for the message may improve phase tracking by the base station 110 and/or the UE 120. Therefore, the UE 120 and/or the base station 110 may determine that the PTRS is to have a higher time domain resource allocation density and/or a higher frequency domain resource allocation density at the edges of the time domain resource allocation for the message. Moreover, by using a non-uniform a resource allocation density for the PTRS, resources may be conserved that would have otherwise been used to transmit the message using a higher PTRS resource allocation density across the entire time domain resource allocation for the message.

As shown by reference numbers 530 and 535, the UE 120 and the base station 110 may communicate a PTRS associated with the message based at least in part on receiving the indication of the repetition factor or the indication that DMRS bundling is to be applied. As used herein, "communicating" may refer to a UE 120 transmitting and the base station 110 receiving (e.g., for an uplink message) or to the UE 120 receiving and the base station 110 transmitting (e.g., for a downlink message). For example, as shown by reference number 530, if the message is an uplink message (e.g., a PUSCH message), then the UE 120 may transmit, and the base station 110 may receive, an uplink PTRS associated with the message (e.g., the uplink message may include one or more embedded PTRS REs or tones). For example, based at least in part on activating the PTRS as described elsewhere herein, the base station 110 may monitor for the PTRS in the uplink message (e.g., in accordance with the one or more parameters for the PTRS as determined by the base station 110, as described in more detail elsewhere herein).

Alternatively, as shown by reference number 535, if the message is a downlink message (e.g., a PDSCH message), then the base station 110 may transmit, and the UE 120 may receive, a downlink PTRS associated with the message (e.g., the downlink message may include one or more embedded PTRS REs or tones). For example, based at least in part on activating the PTRS as described elsewhere herein, the UE 120 may monitor for the PTRS in the downlink message (e.g., in accordance with the one or more parameters for the PTRS as determined by the UE 120, as described in more detail elsewhere herein).

For example, the UE 120 and the base station 110 may communicate a PTRS associated with the message using the one or more parameters associated with the PTRS (e.g., using a time domain resource density, a frequency domain resource density, a time domain resource starting location, and/or a frequency domain resource starting location). For example, in some aspects, the UE 120 and the base station 110 may communicate a PTRS associated with the message only for repetitions or copies of the message that are not associated with a DMRS or that are associated with a DMRS density that is less than a DMRS density threshold. In some aspects, the UE 120 and the base station 110 may communicate a first PTRS using a first resource allocation density for repetitions or copies of the message that are not associated with a DMRS or that are associated with a DMRS density that is less than a DMRS density threshold. The UE 120 and the base station 110 may communicate a second PTRS using a second resource allocation density for repetitions or copies of the message that are associated with a DMRS or that are associated with a DMRS density that is greater than or equal to the DMRS density threshold, where the first resource allocation density is greater than the second resource allocation density.

In some aspects, the UE 120 and the base station 110 may communicate a PTRS associated with the message using a first resource allocation density for a first subset of symbols of a set of symbols associated with a time domain resource allocation for the message and using a second resource allocation density for a second subset of symbols of the set of symbols.

As shown by reference number 540, the base station 110 may track phase shifts over time using the PTRSs communicated between the UE 120 and the base station 110. For example, the base station 110 may determine a phase shift or a phase jump between repetitions of the message based at least in part on the PTRSs transmitted with the message. As a result, the base station 110 may compensate for the determined phase shift or phase jump when performing joint channel estimation. For example, the base station 110 may compensate for the determined phase shift or phase jump by applying an offset when performing DMRS bundling. As a result, an accuracy of the joint channel estimation performed by the base station 110 may be improved by enabling the base station 110 to track phase shifts and compensate for the phase shifts.

As a result, the UE 120 and/or the base station 110 may be enabled to transmit a PTRS based at least in part on repetitions of a message and/or DMRS bundling for the message being indicated. Therefore, a base station 110 may be enabled to track phase shifts over different transmissions using PTRSs. As a result, the base station 110 may be enabled to compensate for phase shifts or phase jumps across transmissions by a UE 120, for example. Therefore, the base station 110 may improve communication performance and/or improve an accuracy of joint channel estimations based at least in part on tracking phase shifts over different transmissions using PTRSs and compensating for the phase shifts. Moreover, this reduces a signaling overhead that would have otherwise been present if the base station 110 were to dynamically activate PTRSs each time that a message is to be associated with repetitions and/or DMRS bundling across repetitions.

As indicated above, FIG. 5 is provided as an example. Other examples may differ from what is described with respect to FIG. 5.

Figure 6:
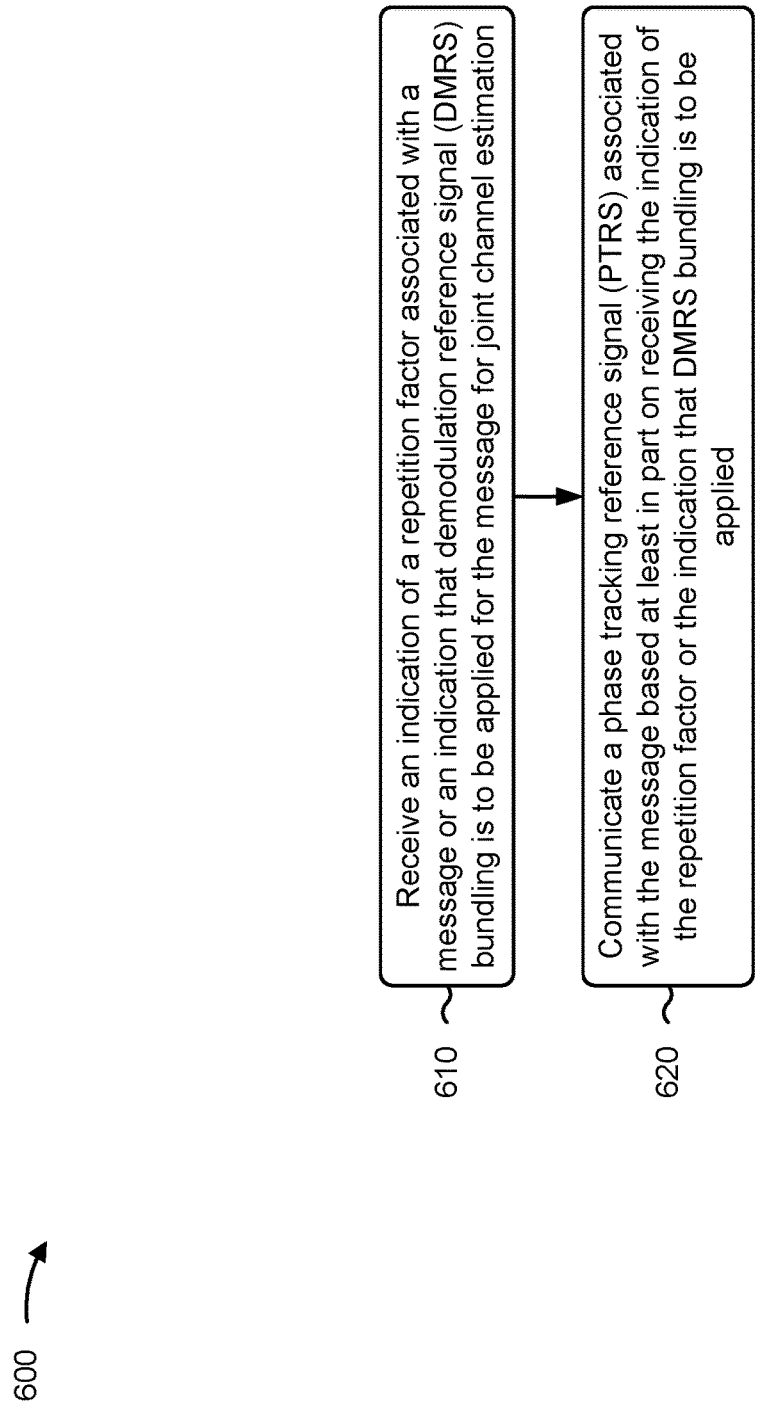
FIGS. 6 and 7 are diagrams illustrating example processes associated with PTRS activation based at least in part on a repetition indication or a DMRS bundling indication, in accordance with the present disclosure.

FIG. 6 is a diagram illustrating an example process 600 performed, for example, by a UE, in accordance with the present disclosure. Example process 600 is an example where the UE (e.g., UE 120) performs operations associated with PTRS activation based on repetition indication or DMRS bundling indication.

As shown in FIG. 6, in some aspects, process 600 may include receiving an indication of a repetition factor associated with a message or an indication that DMRS bundling is to be applied for the message for joint channel estimation (block 610). For example, the UE (e.g., using communication manager 140 and/or reception component 802, depicted in FIG. 8) may receive an indication of a repetition factor associated with a message or an indication that DMRS bundling is to be applied for the message for joint channel estimation, as described above.

As further shown in FIG. 6, in some aspects, process 600 may include communicating a PTRS associated with the message based at least in part on receiving the indication of the repetition factor or the indication that DMRS bundling is to be applied (block 620). For example, the UE (e.g., using communication manager 140, reception component 802, and/or transmission component 804, depicted in FIG. 8) may communicate a PTRS associated with the message based at least in part on receiving the indication of the repetition factor or the indication that DMRS bundling is to be applied, as described above.

Process 600 may include additional aspects, such as any single aspect or any combination of aspects described below and/or in connection with one or more other processes described elsewhere herein.

In a first aspect, the message is an uplink message, and communicating the PTRS includes transmitting an uplink PTRS associated with the message.

In a second aspect, alone or in combination with the first aspect, the message is a downlink message, and communicating the PTRS includes receiving a downlink PTRS associated with the message.

In a third aspect, alone or in combination with one or more of the first and second aspects, process 600 includes activating a PTRS presence field to indicate that PTRSs are enabled for the message based at least in part on receiving the indication of the repetition factor or the indication that DMRS bundling is to be applied.

In a fourth aspect, alone or in combination with one or more of the first through third aspects, receiving the indication of the repetition factor or the indication that DMRS bundling is to be applied includes receiving DCI scheduling the message, where the DCI indicates one or more parameters associated with the PTRS.

In a fifth aspect, alone or in combination with one or more of the first through fourth aspects, process 600 includes determining one or more parameters associated with the PTRS based at least in part on one or more parameters associated with the message, where the one or more parameters associated with the message include at least one of a modulation and coding scheme, a bandwidth, a number of repetitions, a DMRS pattern, or a DMRS density.

In a sixth aspect, alone or in combination with one or more of the first through fifth aspects, communicating the PTRS includes communicating the PTRS using one or more parameters associated with the PTRS, the one or more parameters including at least one of a time domain resource density, a frequency domain resource density, a time domain resource starting location, or a frequency domain resource starting location.

In a seventh aspect, alone or in combination with one or more of the first through sixth aspects, communicating the PTRS includes communicating the PTRS only for repetitions or copies of the message that are not associated with a DMRS or that are associated with a DMRS density that is less than a DMRS density threshold.

In an eighth aspect, alone or in combination with one or more of the first through seventh aspects, communicating the PTRS includes communicating a first PTRS using a first resource allocation density for repetitions or copies of the message that are not associated with a DMRS or that are associated with a DMRS density that is less than a DMRS density threshold, and communicating a second PTRS using a second resource allocation density for repetitions or copies of the message that are associated with a DMRS or that are associated with a DMRS density that is greater than or equal to the DMRS density threshold, where the first resource allocation density is greater than the second resource allocation density.

In a ninth aspect, alone or in combination with one or more of the first through eighth aspects, communicating the PTRS includes communicating the PTRS using: a first resource allocation density for a first subset of symbols of a set of symbols associated with a time domain resource allocation for the message, and a second resource allocation density for a second subset of symbols of the set of symbols, where the first resource allocation density is greater than the second resource allocation density, and where the first subset of symbols is associated with an edge of the time domain resource allocation for the PTRS.

In a tenth aspect, alone or in combination with one or more of the first through ninth aspects, communicating the PTRS is based at least in part on one or more trigger conditions being satisfied.

In an eleventh aspect, alone or in combination with one or more of the first through tenth aspects, the one or more trigger conditions include a trigger condition associated with at least one of a frequency range, a frequency band, or a subcarrier spacing.

In a twelfth aspect, alone or in combination with one or more of the first through eleventh aspects, the one or more trigger conditions include a trigger condition associated with a spectrum configuration associated with the message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
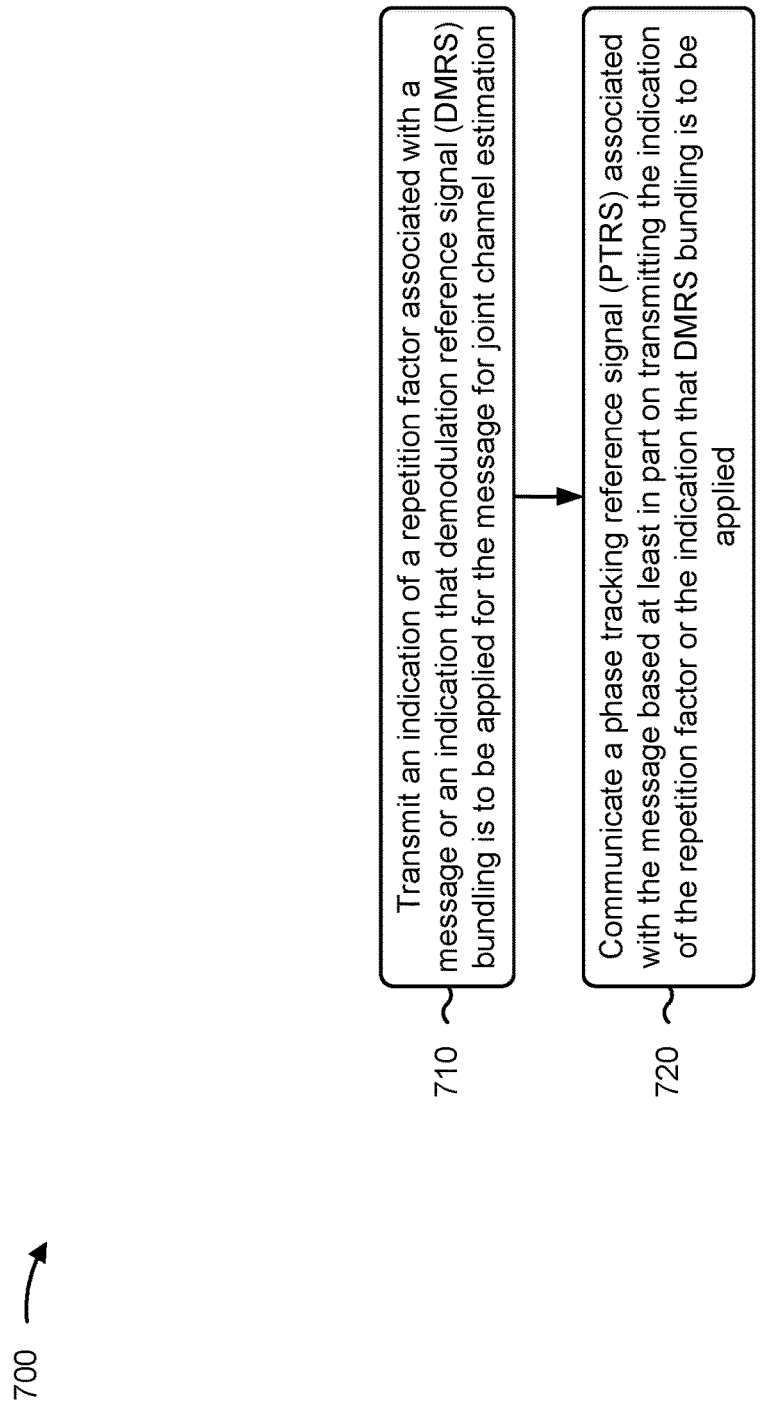

FIG. 7 is a diagram illustrating an example process 700 performed, for example, by a base station, in accordance with the present disclosure. Example process 700 is an example where the base station (e.g., base station 110) performs operations associated with PTRS activation based on repetition indication or DMRS bundling indication.

As shown in FIG. 7, in some aspects, process 700 may include transmitting an indication of a repetition factor associated with a message or an indication that DMRS bundling is to be applied for the message for joint channel estimation (block 710). For example, the base station (e.g., using communication manager 150 and/or transmission component 904, depicted in FIG. 9) may transmit an indication of a repetition factor associated with a message or an indication that DMRS bundling is to be applied for the message for joint channel estimation, as described above.

As further shown in FIG. 7, in some aspects, process 700 may include communicating a PTRS associated with the message based at least in part on transmitting the indication of the repetition factor or the indication that DMRS bundling is to be applied (block 720). For example, the base station (e.g., using communication manager 150, reception component 902, and/or transmission component 904, depicted in FIG. 9) may communicate a PTRS associated with the message based at least in part on transmitting the indication of the repetition factor or the indication that DMRS bundling is to be applied, as described above.

Process 700 may include additional aspects, such as any single aspect or any combination of aspects described below and/or in connection with one or more other processes described elsewhere herein.

In a first aspect, the message is an uplink message, and communicating the PTRS includes receiving an uplink PTRS associated with the message.

In a second aspect, alone or in combination with the first aspect, the message is a downlink message, and communicating the PTRS includes transmitting a downlink PTRS associated with the message.

In a third aspect, alone or in combination with one or more of the first and second aspects, process 700 includes activating a PTRS presence field to indicate that PTRSs are enabled for the message based at least in part on transmitting the indication of the repetition factor or the indication that DMRS bundling is to be applied.

In a fourth aspect, alone or in combination with one or more of the first through third aspects, transmitting the indication of the repetition factor or the indication that DMRS bundling is to be applied includes transmitting DCI scheduling the message, where the DCI indicates one or more parameters associated with the PTRS.

In a fifth aspect, alone or in combination with one or more of the first through fourth aspects, process 700 includes determining one or more parameters associated with the PTRS based at least in part on one or more parameters associated with the message, where the one or more parameters associated with the message include at least one of a modulation and coding scheme, a bandwidth, a number of repetitions, a DMRS pattern, or a DMRS density.

In a sixth aspect, alone or in combination with one or more of the first through fifth aspects, communicating the PTRS includes communicating the PTRS using one or more parameters associated with the PTRS, the one or more parameters including at least one of a time domain resource density, a frequency domain resource density, a time domain resource starting location, or a frequency domain resource starting location.

In a seventh aspect, alone or in combination with one or more of the first through sixth aspects, communicating the PTRS includes communicating the PTRS only for repetitions or copies of the message that are not associated with a DMRS or that are associated with a DMRS density that is less than a DMRS density threshold.

In an eighth aspect, alone or in combination with one or more of the first through seventh aspects, communicating the PTRS includes communicating a first PTRS using a first resource allocation density for repetitions or copies of the message that are not associated with a DMRS or that are associated with a DMRS density that is less than a DMRS density threshold, and communicating a second PTRS using a second resource allocation density for repetitions or copies of the message that are associated with a DMRS or that are associated with a DMRS density that is greater than or equal to the DMRS density threshold, wherein the first resource allocation density is greater than the second resource allocation density.

In a ninth aspect, alone or in combination with one or more of the first through eighth aspects, communicating the PTRS includes communicating the PTRS using: a first resource allocation density for a first subset of symbols of a set of symbols associated with a time domain resource allocation for the message, and a second resource allocation density for a second subset of symbols of the set of symbols, where the first resource allocation density is greater than the second resource allocation density, and where the first subset of symbols is associated with an edge of the time domain resource allocation for the PTRS.

In a tenth aspect, alone or in combination with one or more of the first through ninth aspects, communicating the PTRS is based at least in part on one or more trigger conditions being satisfied.

In an eleventh aspect, alone or in combination with one or more of the first through tenth aspects, the one or more trigger conditions include a trigger condition associated with at least one of a frequency range, a frequency band, or a subcarrier spacing.

In a twelfth aspect, alone or in combination with one or more of the first through eleventh aspects, the one or more trigger conditions include a trigger condition associated with a spectrum configuration associated with the message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
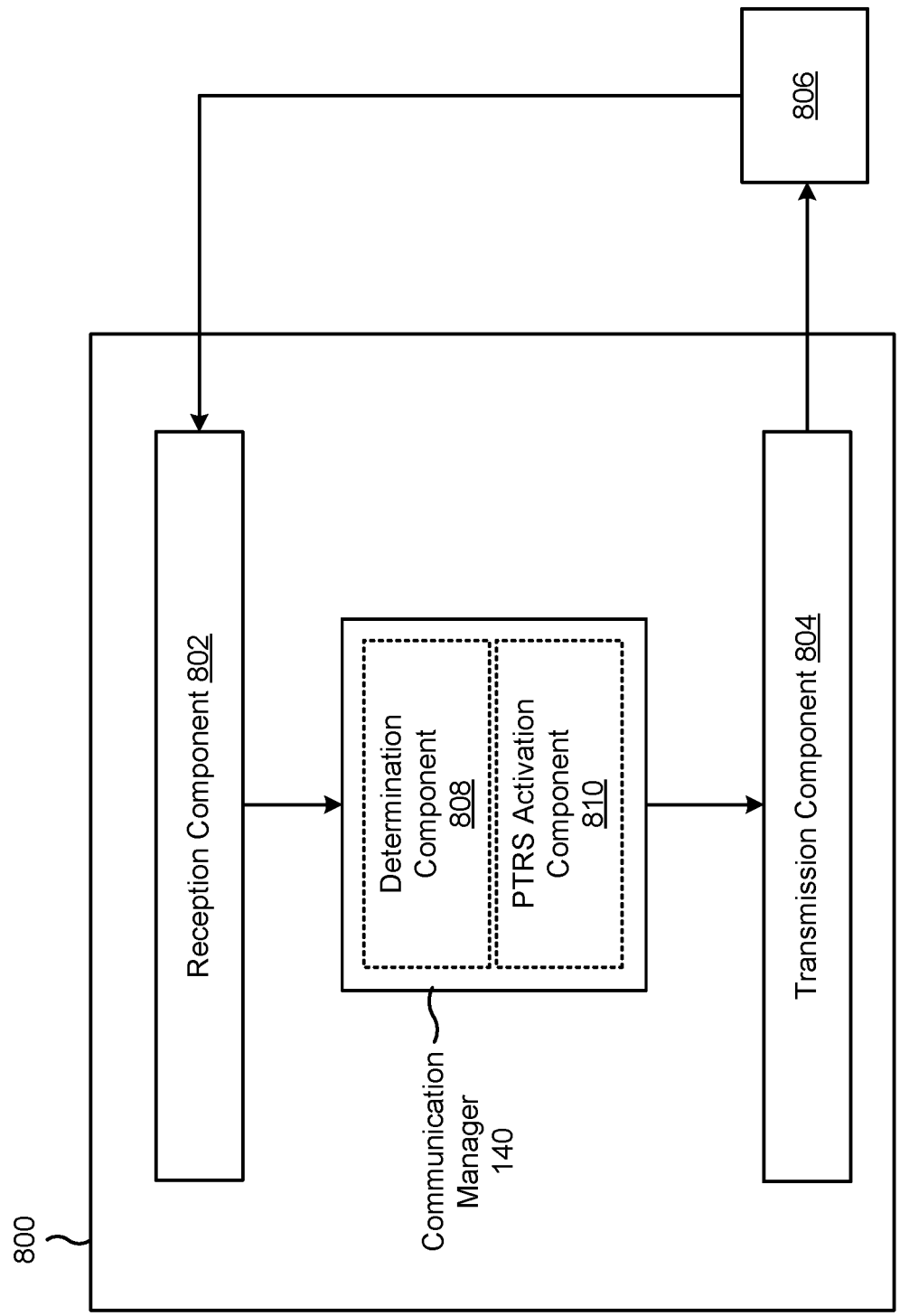
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a determination component 808, and/or a PTRS activation component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive an indication of a repetition factor associated with a message or an indication that DMRS bundling is to be applied for the message for joint channel estimation. The reception component 802 and/or the transmission component 804 may communicate a PTRS associated with the message based at least in part on receiving the indication of the repetition factor or the indication that DMRS bundling is to be applied.

The transmission component 804 may transmit an uplink PTRS associated with the message. The reception component 802 may receive a downlink PTRS associated with the message.

The determination component 808 may determine one or more parameters associated with the PTRS. The reception component 802 may receive DCI scheduling the message, the DCI indicating one or more parameters associated with the PTRS.

The PTRS activation component 810 may activate a PTRS presence field to indicate that PTRSs are enabled for the message based at least in part on receiving the indication of the repetition factor or the indication that DMRS bundling is to be applied.

The determination component 808 may determine one or more parameters associated with the PTRS based at least in part on one or more parameters associated with the message, wherein the one or more parameters associated with the message include at least one of a modulation and coding scheme, a bandwidth, a number of repetitions, a DMRS pattern, or a DMRS density.

The reception component 802 and/or the transmission component 804 may communicate the PTRS using the one or more parameters associated with the PTRS. The reception component 802 and/or the transmission component 804 may communicate the PTRS using a first resource allocation density for a first subset of symbols of a set of symbols associated with a time domain resource allocation for the message, and a second resource allocation density for a second subset of symbols of the set of symbols. The reception component 802 and/or the transmission component 804 may communicate the PTRS only for repetitions or copies of the message that are not associated with a DMRS or that are associated with a DMRS density that is less than a DMRS density threshold.

The reception component 802 and/or the transmission component 804 may communicate a first PTRS using a first resource allocation density for repetitions or copies of the message that are not associated with a DMRS or that are associated with a DMRS density that is less than a DMRS density threshold. The reception component 802 and/or the transmission component 804 may communicate a second PTRS using a second resource allocation density for repetitions or copies of the message that are associated with a DMRS or that are associated with a DMRS density that is greater than or equal to the DMRS density threshold, where the first resource allocation density is greater than the second resource allocation density.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
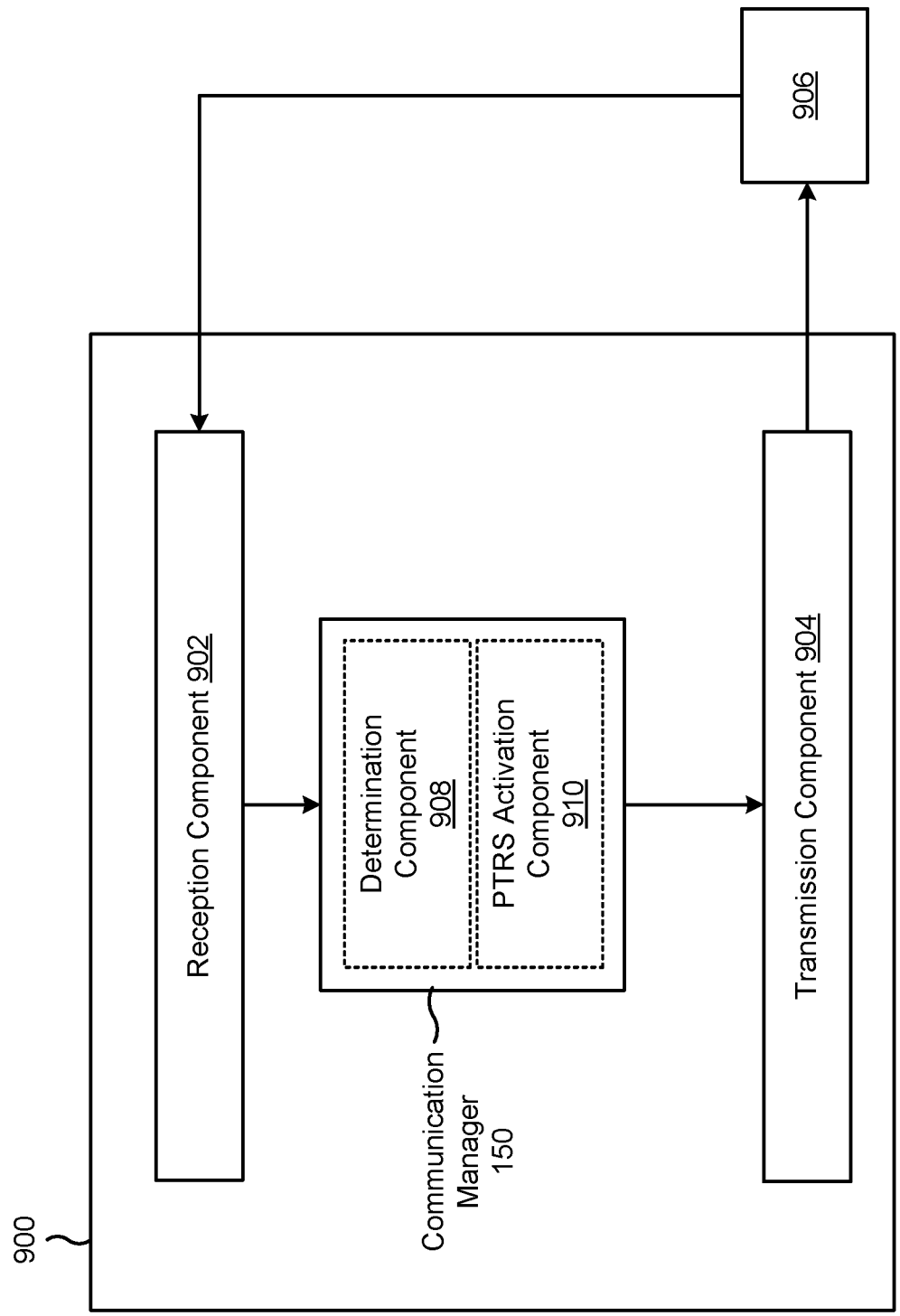

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a determination component 908, and/or a PTRS activation component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit an indication of a repetition factor associated with a message or an indication that DMRS bundling is to be applied for the message for joint channel estimation. The reception component 902 and/or the transmission component 904 may communicate a PTRS associated with the message based at least in part on transmitting the indication of the repetition factor or the indication that DMRS bundling is to be applied.

The reception component 902 may receive an uplink PTRS associated with the message. The transmission component 904 may transmit a downlink PTRS associated with the message.

The determination component 908 may determine one or more parameters associated with the PTRS.

The PTRS activation component 910 may activate a PTRS presence field to indicate that PTRSs are enabled for the message based at least in part on transmitting the indication of the repetition factor or the indication that DMRS bundling is to be applied.

The transmission component 904 may transmit DCI scheduling the message, the DCI indicating one or more parameters associated with the PTRS.

The determination component 908 may determine one or more parameters associated with the PTRS based at least in part on one or more parameters associated with the message, wherein the one or more parameters associated with the message include at least one of a modulation and coding scheme, a bandwidth, a number of repetitions, a DMRS pattern, or a DMRS density.

The reception component 902 and/or the transmission component 904 may communicate the PTRS using one or more parameters associated with the PTRS. The reception component 902 and/or the transmission component 904 may communicate the PTRS only for repetitions or copies of the message that are not associated with a DMRS or that are associated with a DMRS density that is less than a DMRS density threshold.

The reception component 902 and/or the transmission component 904 may communicate a first PTRS using a first resource allocation density for repetitions or copies of the message that are not associated with a DMRS or that are associated with a DMRS density that is less than a DMRS density threshold. The reception component 902 and/or the transmission component 904 may communicate a second PTRS using a second resource allocation density for repetitions or copies of the message that are associated with a DMRS or that are associated with a DMRS density that is greater than or equal to the DMRS density threshold, where the first resource allocation density is greater than the second resource allocation density.

The reception component 902 and/or the transmission component 904 may communicate the PTRS using a first resource allocation density for a first subset of symbols of a set of symbols associated with a time domain resource allocation for the message, and a second resource allocation density for a second subset of symbols of the set of symbols.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving an indication of a repetition factor associated with a message or an indication that demodulation reference signal (DMRS) bundling is to be applied for the message for joint channel estimation; and communicating a phase tacking reference signal (PTRS) associated with the message based at least in part on receiving the indication of the repetition factor or the indication that DMRS bundling is to be applied.

Aspect 2: The method of Aspect 1, wherein the message is an uplink message, and wherein communicating the PTRS comprises: transmitting an uplink PTRS associated with the message.

Aspect 3: The method of Aspect 1, wherein the message is a downlink message, and wherein communicating the PTRS comprises: receiving a downlink PTRS associated with the message.

Aspect 4: The method of any of Aspects 1-3, further comprising: activating a PTRS presence field to indicate that PTRSs are enabled for the message based at least in part on receiving the indication of the repetition factor or the indication that DMRS bundling is to be applied.

Aspect 5: The method of any of Aspects 1-4, wherein receiving the indication of the repetition factor or the indication that DMRS bundling is to be applied comprises: receiving downlink control information (DCI) scheduling the message, wherein the DCI indicates one or more parameters associated with the PTRS.

Aspect 6: The method of any of Aspects 1-5, further comprising: determining one or more parameters associated with the PTRS based at least in part on one or more parameters associated with the message, wherein the one or more parameters associated with the message include at least one of: a modulation and coding scheme, a bandwidth, a number of repetitions, a DMRS pattern, or a DMRS density.

Aspect 7: The method of any of Aspects 1-6, wherein communicating the PTRS comprises communicating the PTRS using one or more parameters associated with the PTRS, the one or more parameters including at least one of: a time domain resource density, a frequency domain resource density, a time domain resource starting location, or a frequency domain resource starting location.

Aspect 8: The method of any of Aspects 1-7, wherein communicating the PTRS comprises: communicating the PTRS only for repetitions or copies of the message that are not associated with a DMRS or that are associated with a DMRS density that is less than a DMRS density threshold.

Aspect 9: The method of any of Aspects 1-7, wherein communicating the PTRS comprises: communicating a first PTRS using a first resource allocation density for repetitions or copies of the message that are not associated with a DMRS or that are associated with a DMRS density that is less than a DMRS density threshold; and communicating a second PTRS using a second resource allocation density for repetitions or copies of the message that are associated with a DMRS or that are associated with a DMRS density that is greater than or equal to the DMRS density threshold, wherein the first resource allocation density is greater than the second resource allocation density.

Aspect 10: The method of any of Aspects 1-9, wherein communicating the PTRS comprises: communicating the PTRS using a first resource allocation density for a first subset of symbols of a set of symbols associated with a time domain resource allocation for the message, and a second resource allocation density for a second subset of symbols of the set of symbols, wherein the first resource allocation density is greater than the second resource allocation density, and wherein the first subset of symbols is associated with an edge of the time domain resource allocation for the PTRS.

Aspect 11: The method of any of Aspects 1-10, wherein communicating the PTRS is based at least in part on one or more trigger conditions being satisfied.

Aspect 12: The method of Aspect 11, wherein the one or more trigger conditions include a trigger condition associated with at least one of a frequency range, a frequency band, or a subcarrier spacing.

Aspect 13: The method of any of Aspects 11-12, wherein the one or more trigger conditions include a trigger condition associated with a spectrum configuration associated with the message.

Aspect 14: A method of wireless communication performed by a base station, comprising: transmitting an indication of a repetition factor associated with a message or an indication that demodulation reference signal (DMRS) bundling is to be applied for the message for joint channel estimation; and communicating a phase tacking reference signal (PTRS) associated with the message based at least in part on transmitting the indication of the repetition factor or the indication that DMRS bundling is to be applied.

Aspect 15: The method of Aspect 14, wherein the message is an uplink message, and wherein communicating the PTRS comprises: receiving an uplink PTRS associated with the message.

Aspect 16: The method of Aspect 14, wherein the message is a downlink message, and wherein communicating the PTRS comprises: transmitting a downlink PTRS associated with the message.

Aspect 17: The method of any of Aspects 14-16, further comprising: activating a PTRS presence field to indicate that PTRSs are enabled for the message based at least in part on transmitting the indication of the repetition factor or the indication that DMRS bundling is to be applied.

Aspect 18: The method of any of Aspects 14-17, wherein transmitting the indication of the repetition factor or the indication that DMRS bundling is to be applied comprises: transmitting downlink control information (DCI) scheduling the message, wherein the DCI indicates one or more parameters associated with the PTRS.

Aspect 19: The method of any of Aspects 14-18, further comprising: determining one or more parameters associated with the PTRS based at least in part on one or more parameters associated with the message, wherein the one or more parameters associated with the message include at least one of: a modulation and coding scheme, a bandwidth, a number of repetitions, a DMRS pattern, or a DMRS density.

Aspect 20: The method of any of Aspects 14-19, wherein communicating the PTRS comprises communicating the PTRS using one or more parameters associated with the PTRS, the one or more parameters including at least one of: a time domain resource density, a frequency domain resource density, a time domain resource starting location, or a frequency domain resource starting location.

Aspect 21: The method of any of Aspects 14-20, wherein communicating the PTRS comprises: communicating the PTRS only for repetitions or copies of the message that are not associated with a DMRS or that are associated with a DMRS density that is less than a DMRS density threshold.

Aspect 22: The method of any of Aspects 14-20, wherein communicating the PTRS comprises: communicating a first PTRS using a first resource allocation density for repetitions or copies of the message that are not associated with a DMRS or that are associated with a DMRS density that is less than a DMRS density threshold; and communicating a second PTRS using a second resource allocation density for repetitions or copies of the message that are associated with a DMRS or that are associated with a DMRS density that is greater than or equal to the DMRS density threshold, wherein the first resource allocation density is greater than the second resource allocation density.

Aspect 23: The method of any of Aspects 14-22, wherein communicating the PTRS comprises: communicating the PTRS using a first resource allocation density for a first subset of symbols of a set of symbols associated with a time domain resource allocation for the message, and a second resource allocation density for a second subset of symbols of the set of symbols, wherein the first resource allocation density is greater than the second resource allocation density, and wherein the first subset of symbols is associated with an edge of the time domain resource allocation for the PTRS.

Aspect 24: The method of any of Aspects 14-23, wherein communicating the PTRS is based at least in part on one or more trigger conditions being satisfied.

Aspect 25: The method of Aspect 24, wherein the one or more trigger conditions include a trigger condition associated with at least one of a frequency range, a frequency band, or a subcarrier spacing.

Aspect 26: The method of any of Aspects 24-25, wherein the one or more trigger conditions include a trigger condition associated with a spectrum configuration associated with the message.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 32: A non-transitory computer-readable medium storing a set of instructions for wireless communication, the set of instructions comprising one or more instructions that, when executed by one or more processors of a device, cause the device to perform the method of one or more of Aspects 1-13.

Aspect 33: An apparatus for wireless communication at a device, comprising a processor; memory coupled with the processor; and instructions stored in the memory and executable by the processor to cause the apparatus to perform the method of one or more of Aspects 14-26.

Aspect 34: A device for wireless communication, comprising a memory and one or more processors coupled to the memory, the one or more processors configured to perform the method of one or more of Aspects 14-26.

Aspect 35: An apparatus for wireless communication, comprising at least one means for performing the method of one or more of Aspects 14-26.

Aspect 36: A non-transitory computer-readable medium storing code for wireless communication, the code comprising instructions executable by a processor to perform the method of one or more of Aspects 14-26.

Aspect 37: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to cause the UE to:
        receive an indication of a repetition factor associated with a data message or an indication that demodulation reference signal (DMRS) bundling is to be applied for the data message for joint channel estimation; and
        communicate a phase tracking reference signal (PTRS) associated with the data message based at least in part on receiving the indication of the repetition factor or the indication that DMRS bundling is to be applied.

2. The UE of claim 1, wherein the one or more processors are further configured to cause the UE to:
    activate a PTRS presence field to indicate that PTRSs are enabled for the data message based at least in part on receiving the indication of the repetition factor or the indication that DMRS bundling is to be applied.

3. The UE of claim 1, wherein the one or more processors, to cause the UE to receive the indication of the repetition factor or the indication that DMRS bundling is to be applied, are configured to cause the UE to:
    receive downlink control information (DCI) scheduling the data message, wherein the DCI indicates one or more parameters associated with the PTRS.

4. The UE of claim 1, wherein the one or more processors are further configured to cause the UE to:
    determine one or more parameters associated with the PTRS based at least in part on one or more parameters associated with the data message, wherein the one or more parameters associated with the data message include at least one of:
        a modulation and coding scheme,
        a bandwidth,
        a number of repetitions, a DMRS pattern, or
a DMRS density.

5. The UE of claim 1, wherein the one or more processors, to communicate the PTRS, are configured to cause the UE to communicate the PTRS using one or more parameters associated with the PTRS, the one or more parameters including at least one of:
a time domain resource density,
a frequency domain resource density,
a time domain resource starting location, or
a frequency domain resource starting location.

6. The UE of claim 1, wherein the one or more processors, to communicate the PTRS, are configured to cause the UE to:
communicate the PTRS only for repetitions or copies of the data message that are not associated with a DMRS or that are associated with a DMRS density that is less than a DMRS density threshold.

7. The UE of claim 1, wherein the one or more processors, to communicate the PTRS, are configured to cause the UE to:
communicate a first PTRS using a first resource allocation density for repetitions or copies of the data message that are not associated with a DMRS or that are associated with a DMRS density that is less than a DMRS density threshold; and
communicate a second PTRS using a second resource allocation density for repetitions or copies of the data message that are associated with a DMRS or that are associated with a DMRS density that is greater than or equal to the DMRS density threshold, wherein the first resource allocation density is greater than the second resource allocation density.

8. The UE of claim 1, wherein the one or more processors, to communicate the PTRS, are configured to cause the UE to:
communicate the PTRS using:
a first resource allocation density for a first subset of symbols of a set of symbols associated with a time domain resource allocation for the data message, and
a second resource allocation density for a second subset of symbols of the set of symbols,
wherein the first resource allocation density is greater than the second resource allocation density, and wherein the first subset of symbols is associated with an edge of the time domain resource allocation for the PTRS.

9. The UE of claim 1, wherein communicating the PTRS is based at least in part on one or more trigger conditions being satisfied, wherein the one or more trigger conditions include at least one of a trigger condition associated with at least one of a frequency range, a frequency band or a subcarrier spacing; or a trigger condition associated with a spectrum configuration associated with the data message.

10. A base station for wireless communication, comprising:
a memory; and
one or more processors, coupled to the memory, configured to cause the base station to:
transmit an indication of a repetition factor associated with a data message or an indication that demodulation reference signal (DMRS) bundling is to be applied for the data message for joint channel estimation; and
communicate a phase tracking reference signal (PTRS) associated with the data message based at least in part on transmitting the indication of the repetition factor or the indication that DMRS bundling is to be applied.

11. The base station of claim 10, wherein the one or more processors are further configured to cause the base station to:
activate a PTRS presence field to indicate that PTRSs are enabled for the data message based at least in part on transmitting the indication of the repetition factor or the indication that DMRS bundling is to be applied.

12. The base station of claim 10, wherein the one or more processors, to transmit the indication of the repetition factor or the indication that DMRS bundling is to be applied, are configured to cause the base station to:
transmit downlink control information (DCI) scheduling the data message, wherein the DCI indicates one or more parameters associated with the PTRS.

13. The base station of claim 10, wherein the one or more processors are further configured to cause the base station to:
determine one or more parameters associated with the PTRS based at least in part on one or more parameters associated with the data message, wherein the one or more parameters associated with the data message include at least one of:
a modulation and coding scheme,
a bandwidth,
a number of repetitions,
a DMRS pattern, or
a DMRS density.

14. The base station of claim 10, wherein the one or more processors, to communicate the PTRS, are configured to cause the base station to communicate the PTRS using one or more parameters associated with the PTRS, the one or more parameters including at least one of:
a time domain resource density,
a frequency domain resource density,
a time domain resource starting location, or
a frequency domain resource starting location.

15. The base station of claim 10, wherein the one or more processors, to communicate the PTRS, are configured to cause the base station to:
communicate the PTRS only for repetitions or copies of the data message that are not associated with a DMRS or that are associated with a DMRS density that is less than a DMRS density threshold.

16. The base station of claim 10, wherein the one or more processors, to communicate the PTRS, are configured to cause the base station to:
communicate a first PTRS using a first resource allocation density for repetitions or copies of the data message that are not associated with a DMRS or that are associated with a DMRS density that is less than a DMRS density threshold; and
communicate a second PTRS using a second resource allocation density for repetitions or copies of the data message that are associated with a DMRS or that are associated with a DMRS density that is greater than or equal to the DMRS density threshold, wherein the first resource allocation density is greater than the second resource allocation density.

17. The base station of claim 10, wherein the one or more processors, to communicate the PTRS, are configured to cause the base station to:
communicate the PTRS using:
a first resource allocation density for a first subset of symbols of a set of symbols associated with a time domain resource allocation for the data message, and a second resource allocation density for a second subset of symbols of the set of symbols, wherein the first resource allocation density is greater than the second resource allocation density, and wherein the first subset of symbols is associated with an edge of the time domain resource allocation for the PTRS.

18. The base station of claim 10, wherein communicating the PTRS is based at least in part on least in part on one or more trigger conditions being satisfied, wherein the one or more trigger conditions include at least one of a trigger condition associated with at least one of a frequency range, a frequency band, or a subcarrier spacing; or a trigger condition associated with a spectrum configuration associated with the data message.

19. A method of wireless communication performed by a user equipment (UE), comprising:

receiving an indication of a repetition factor associated with a data message or an indication that demodulation reference signal (DMRS) bundling is to be applied for the data message for joint channel estimation; and communicating a phase tracking reference signal (PTRS) associated with the data message based at least in part on receiving the indication of the repetition factor or the indication that DMRS bundling is to be applied.

20. The method of claim 19, wherein receiving the indication of the repetition factor or the indication that DMRS bundling is to be applied comprises:

receiving downlink control information (DCI) scheduling the data message, wherein the DCI indicates one or more parameters associated with the PTRS.

21. The method of claim 19, further comprising:

determining one or more parameters associated with the PTRS based at least in part on one or more parameters associated with the data message, wherein the one or more parameters associated with the data message include at least one of:

a modulation and coding scheme,
a bandwidth,
a number of repetitions,
a DMRS pattern, or
a DMRS density.

22. The method of claim 19, wherein communicating the PTRS comprises communicating the PTRS using one or more parameters associated with the PTRS, the one or more parameters including at least one of:

a time domain resource density,
a frequency domain resource density,
a time domain resource starting location, or
a frequency domain resource starting location.

23. The method of claim 19, wherein communicating the PTRS comprises:

communicating a first PTRS using a first resource allocation density for repetitions or copies of the data message that are not associated with a DMRS or that are associated with a DMRS density that is less than a DMRS density threshold; and communicating a second PTRS using a second resource allocation density for repetitions or copies of the data message that are associated with a DMRS or that are associated with a DMRS density that is greater than or equal to the DMRS density threshold, wherein the first resource allocation density is greater than the second resource allocation density.

24. The method of claim 19, wherein communicating the PTRS comprises:

communicating the PTRS using a first resource allocation density for a first subset of symbols of a set of symbols associated with a time domain resource allocation for the data message, and a second resource allocation density for a second subset of symbols of the set of symbols, wherein the first resource allocation density is greater than the second resource allocation density, and wherein the first subset of symbols is associated with an edge of the time domain resource allocation for the PTRS.

25. A method of wireless communication performed by a base station, comprising:

transmitting an indication of a repetition factor associated with a data message or an indication that demodulation reference signal (DMRS) bundling is to be applied for the data message for joint channel estimation; and communicating a phase tracking reference signal (PTRS) associated with the data message based at least in part on transmitting the indication of the repetition factor or the indication that DMRS bundling is to be applied.

26. The method of claim 25, wherein transmitting the indication of the repetition factor or the indication that DMRS bundling is to be applied comprises:

transmitting downlink control information (DCI) scheduling the data message, wherein the DCI indicates one or more parameters associated with the PTRS.

27. The method of claim 25, further comprising:

determining one or more parameters associated with the PTRS based at least in part on one or more parameters associated with the data message, wherein the one or more parameters associated with the data message include at least one of:

a modulation and coding scheme,
a bandwidth,
a number of repetitions,
a DMRS pattern, or
a DMRS density.

28. The method of claim 25, wherein communicating the PTRS comprises communicating the PTRS using one or more parameters associated with the PTRS, the one or more parameters including at least one of:

a time domain resource density,
a frequency domain resource density,
a time domain resource starting location, or
a frequency domain resource starting location.

29. The method of claim 25, wherein communicating the PTRS comprises:

communicating the PTRS only for repetitions or copies of the data message that are not associated with a DMRS or that are associated with a DMRS density that is less than a DMRS density threshold.

30. The method of claim 25, wherein communicating the PTRS comprises:

communicating the PTRS using a first resource allocation density for a first subset of symbols of a set of symbols associated with a time domain resource allocation for the data message, and a second resource allocation density for a second subset of symbols of the set of symbols, wherein the first resource allocation density is greater than the second resource allocation density, and wherein the first subset of symbols is associated with an edge of the time domain resource allocation for the PTRS.

* * * * *